US010555009B2

(12) United States Patent
Nagashima et al.

(10) Patent No.: US 10,555,009 B2
(45) Date of Patent: Feb. 4, 2020

(54) ENCODING DEVICE, ENCODING METHOD, DECODING DEVICE, DECODING METHOD, AND GENERATION METHOD

(71) Applicant: CANON KABUSHIKI KAISHA, Tokyo (JP)

(72) Inventors: Takayuki Nagashima, Yokohama (JP); Daisaku Moriwaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 15/837,347

(22) Filed: Dec. 11, 2017

(65) Prior Publication Data
US 2018/0167643 A1 Jun. 14, 2018

(30) Foreign Application Priority Data
Dec. 12, 2016 (JP) .................................. 2016-240567

(51) Int. Cl.
*G06K 9/00* (2006.01)
*H04N 19/90* (2014.01)
*H04N 19/17* (2014.01)
*H04N 19/14* (2014.01)
*H04N 19/186* (2014.01)
*H04N 1/64* (2006.01)
*H04N 19/70* (2014.01)

(52) U.S. Cl.
CPC ............. *H04N 19/99* (2014.11); *H04N 1/648* (2013.01); *H04N 19/14* (2014.11); *H04N 19/17* (2014.11); *H04N 19/186* (2014.11); *H04N 19/70* (2014.11)

(58) Field of Classification Search
CPC ........ H04N 19/99; H04N 19/17; H04N 19/14; H04N 19/186; H04N 1/648; H04N 19/70; H04N 1/41; H04N 1/64; H04N 19/426
USPC ...................................................... 382/199
See application file for complete search history.

(56) References Cited

U.S. PATENT DOCUMENTS

| 5,768,438 A * | 6/1998 | Etoh | H04N 19/61 |
| | | | 382/251 |
| 2006/0013304 A1* | 1/2006 | Maeda | G06T 9/20 |
| | | | 375/240.11 |
| 2008/0154928 A1* | 6/2008 | Bashyam | H03M 7/30 |

(Continued)

FOREIGN PATENT DOCUMENTS

| JP | 2000-149035 A | 5/2000 |
| JP | 2017-005686 A | 1/2017 |

*Primary Examiner* — Van D Huynh
(74) *Attorney, Agent, or Firm* — Carter, DeLuca & Farrell LLP

(57) ABSTRACT

An encoding device comprises: a dividing unit configured to divide an encoding unit of an image into a plurality of regions; a header generation unit configured to generate, for each boundary that partitions each of the plurality of regions along a direction which crosses a line, a boundary header used to identify the boundary; a trajectory generation unit configured to generate a piece of trajectory information representing a displacement of the boundary associated with progress of a line; and an aligning unit configured to, when generating encoded data including generated boundary headers and generated pieces of trajectory information, change, in accordance with the number of boundaries, a manner in which the generated boundary headers and the generated pieces of trajectory information are aligned.

21 Claims, 22 Drawing Sheets

(56) References Cited

U.S. PATENT DOCUMENTS

| | | | | |
|---|---|---|---|---|
| 2008/0292197 A1* | 11/2008 | Nakagawa | ........... | H04N 19/105 |
| | | | | 382/238 |
| 2014/0205011 A1* | 7/2014 | Sung | .................... | H04N 19/597 |
| | | | | 375/240.12 |
| 2016/0192027 A1* | 6/2016 | Toma | ............... | H04N 21/42615 |
| | | | | 725/118 |
| 2016/0358046 A1* | 12/2016 | Nagashima | .......... | G06K 15/184 |

* cited by examiner

FIG. 7A

| BOUNDARY COUNT (E) | | 21 |
|---|---|---|
| BOUNDARY HEADER OF BOUNDARY 0 | REGION COLOR | 0xAAAAAA |
| | HEAD Y-COORDINATE | 0 |
| | START X-COORDINATE | 0 |
| | END Y-COORDINATE | 1 |
| BOUNDARY HEADER OF BOUNDARY 1 | REGION COLOR | 0x00FF00 |
| | HEAD Y-COORDINATE | 0 |
| | START X-COORDINATE | 2 |
| | END Y-COORDINATE | 1 |
| BOUNDARY HEADER OF BOUNDARY 2 | REGION COLOR | 0xFFFFFF |
| | HEAD Y-COORDINATE | 0 |
| | START X-COORDINATE | 4 |
| | END Y-COORDINATE | 15 |
| BOUNDARY HEADER OF BOUNDARY 3 | REGION COLOR | 0xAAAAAA |
| | HEAD Y-COORDINATE | 0 |
| | START X-COORDINATE | 6 |
| | END Y-COORDINATE | 1 |
| BOUNDARY HEADER OF BOUNDARY 4 | REGION COLOR | 0x00FF00 |
| | HEAD Y-COORDINATE | 0 |
| | START X-COORDINATE | 8 |
| | END Y-COORDINATE | 1 |
| BOUNDARY HEADER OF BOUNDARY 5 | REGION COLOR | 0xFFFFFF |
| | HEAD Y-COORDINATE | 0 |
| | START X-COORDINATE | 10 |
| | END Y-COORDINATE | 5 |
| BOUNDARY HEADER OF BOUNDARY 6 | REGION COLOR | 0xAAAAAA |
| | HEAD Y-COORDINATE | 0 |
| | START X-COORDINATE | 12 |
| | END Y-COORDINATE | 1 |
| BOUNDARY HEADER OF BOUNDARY 7 | REGION COLOR | 0x00FF00 |
| | HEAD Y-COORDINATE | 0 |
| | START X-COORDINATE | 14 |
| | END Y-COORDINATE | 1 |
| BOUNDARY HEADER OF BOUNDARY 8 | REGION COLOR | 0xFFFFFF |
| | HEAD Y-COORDINATE | 1 |
| | START X-COORDINATE | 0 |
| | END Y-COORDINATE | 9 |
| BOUNDARY HEADER OF BOUNDARY 9 | REGION COLOR | 0x880000 |
| | HEAD Y-COORDINATE | 2 |
| | START X-COORDINATE | 2 |
| | END Y-COORDINATE | 7 |
| BOUNDARY HEADER OF BOUNDARY 10 | REGION COLOR | 0x000044 |
| | HEAD Y-COORDINATE | 2 |
| | START X-COORDINATE | 4 |
| | END Y-COORDINATE | 7 |

FIG. 7B

| | | |
|---|---|---|
| BOUNDARY HEADER OF BOUNDARY 11 | REGION COLOR | 0x880000 |
| | HEAD Y-COORDINATE | 2 |
| | START X-COORDINATE | 8 |
| | END Y-COORDINATE | 7 |
| BOUNDARY HEADER OF BOUNDARY 12 | REGION COLOR | 0x000044 |
| | HEAD Y-COORDINATE | 2 |
| | START X-COORDINATE | 10 |
| | END Y-COORDINATE | 7 |
| BOUNDARY HEADER OF BOUNDARY 13 | REGION COLOR | 0x880000 |
| | HEAD Y-COORDINATE | 2 |
| | START X-COORDINATE | 14 |
| | END Y-COORDINATE | 3 |
| BOUNDARY HEADER OF BOUNDARY 14 | REGION COLOR | 0x00FF00 |
| | HEAD Y-COORDINATE | 8 |
| | START X-COORDINATE | 2 |
| | END Y-COORDINATE | 9 |
| BOUNDARY HEADER OF BOUNDARY 15 | REGION COLOR | 0xFFFFFF |
| | HEAD Y-COORDINATE | 8 |
| | START X-COORDINATE | 4 |
| | END Y-COORDINATE | 11 |
| BOUNDARY HEADER OF BOUNDARY 16 | REGION COLOR | 0x808080 |
| | HEAD Y-COORDINATE | 8 |
| | START X-COORDINATE | 6 |
| | END Y-COORDINATE | 13 |
| BOUNDARY HEADER OF BOUNDARY 17 | REGION COLOR | 0x00FF00 |
| | HEAD Y-COORDINATE | 8 |
| | START X-COORDINATE | 8 |
| | END Y-COORDINATE | 15 |
| BOUNDARY HEADER OF BOUNDARY 18 | REGION COLOR | 0x808080 |
| | HEAD Y-COORDINATE | 8 |
| | START X-COORDINATE | 12 |
| | END Y-COORDINATE | 15 |
| BOUNDARY HEADER OF BOUNDARY 19 | REGION COLOR | 0x00FF00 |
| | HEAD Y-COORDINATE | 8 |
| | START X-COORDINATE | 14 |
| | END Y-COORDINATE | 15 |
| BOUNDARY HEADER OF BOUNDARY 20 | REGION COLOR | 0xFFFFFF |
| | HEAD Y-COORDINATE | 9 |
| | START X-COORDINATE | 15 |
| | END Y-COORDINATE | 15 |

FIG. 7C

| | |
|---|---|
| BOUNDARY-SPECIFIC TRAJECTORY INFORMATION OF BOUNDARY 0 | +1 |
| BOUNDARY-SPECIFIC TRAJECTORY INFORMATION OF BOUNDARY 1 | +1 |
| BOUNDARY-SPECIFIC TRAJECTORY INFORMATION OF BOUNDARY 2 | '+1,+1,+1,+1,+1,+1,+1,-1,-1,-1,-1,-1,-1,-1,-1 |
| BOUNDARY-SPECIFIC TRAJECTORY INFORMATION OF BOUNDARY 3 | +1 |
| BOUNDARY-SPECIFIC TRAJECTORY INFORMATION OF BOUNDARY 4 | +1 |
| BOUNDARY-SPECIFIC TRAJECTORY INFORMATION OF BOUNDARY 5 | '+1,+1,+1,+1,+1 |
| BOUNDARY-SPECIFIC TRAJECTORY INFORMATION OF BOUNDARY 6 | +1 |
| BOUNDARY-SPECIFIC TRAJECTORY INFORMATION OF BOUNDARY 7 | +1 |
| BOUNDARY-SPECIFIC TRAJECTORY INFORMATION OF BOUNDARY 8 | '0,0,0,0,0,0,0,0 |
| BOUNDARY-SPECIFIC TRAJECTORY INFORMATION OF BOUNDARY 9 | '+1,+1,+1,+1,+1 |
| BOUNDARY-SPECIFIC TRAJECTORY INFORMATION OF BOUNDARY 10 | '+1,+1,+1,+1,+1 |
| BOUNDARY-SPECIFIC TRAJECTORY INFORMATION OF BOUNDARY 11 | '+1,+1,+1,+1,+1 |
| BOUNDARY-SPECIFIC TRAJECTORY INFORMATION OF BOUNDARY 12 | '+1,+1,+1,+1,+1 |
| BOUNDARY-SPECIFIC TRAJECTORY INFORMATION OF BOUNDARY 13 | +1 |
| BOUNDARY-SPECIFIC TRAJECTORY INFORMATION OF BOUNDARY 14 | '-1,-1,0 |
| BOUNDARY-SPECIFIC TRAJECTORY INFORMATION OF BOUNDARY 15 | '-1,-1,-1,-1,0 |
| BOUNDARY-SPECIFIC TRAJECTORY INFORMATION OF BOUNDARY 16 | '-1,-1,-1,-1,-1,-1,0 |
| BOUNDARY-SPECIFIC TRAJECTORY INFORMATION OF BOUNDARY 17 | '-1,-1,-1,-1,-1,-1,-1 |
| BOUNDARY-SPECIFIC TRAJECTORY INFORMATION OF BOUNDARY 18 | '-1,-1,-1,-1,-1,-1,-1 |
| BOUNDARY-SPECIFIC TRAJECTORY INFORMATION OF BOUNDARY 19 | '-1,-1,-1,-1,-1,-1 |
| BOUNDARY-SPECIFIC TRAJECTORY INFORMATION OF BOUNDARY 20 | '-1,-1,-1,-1,-1,-1 |

FIG. 8A

| | |
|---|---|
| 802 | BOUNDARY COUNT (=21) |
| 804 | BOUNDARY HEADER OF BOUNDARY 0 |
| | BOUNDARY HEADER OF BOUNDARY 1 |
| | BOUNDARY HEADER OF BOUNDARY 2 |
| | BOUNDARY HEADER OF BOUNDARY 3 |
| | BOUNDARY HEADER OF BOUNDARY 4 |
| | BOUNDARY HEADER OF BOUNDARY 5 |
| | BOUNDARY HEADER OF BOUNDARY 6 |
| | BOUNDARY HEADER OF BOUNDARY 7 |
| | BOUNDARY HEADER OF BOUNDARY 8 |
| | BOUNDARY HEADER OF BOUNDARY 9 |
| | BOUNDARY HEADER OF BOUNDARY 10 |
| | BOUNDARY HEADER OF BOUNDARY 11 |
| | BOUNDARY HEADER OF BOUNDARY 12 |
| | BOUNDARY HEADER OF BOUNDARY 13 |
| | BOUNDARY HEADER OF BOUNDARY 14 |
| | BOUNDARY HEADER OF BOUNDARY 15 |
| 806 | TRAJECTORY INFORMATION@Y = 0<br>{BOUNDARY 0(0), BOUNDARY 1(0), BOUNDARY 2(0), BOUNDARY 3(0), BOUNDARY 4(0), BOUNDARY 5(0), BOUNDARY 6(0), BOUNDARY 7(0)} |
| 808 | TRAJECTORY INFORMATION@Y = 1<br>{BOUNDARY 8(1), BOUNDARY 2(1), BOUNDARY 5(1)} |
| 810 | BOUNDARY HEADER OF BOUNDARY 16 |
| | BOUNDARY HEADER OF BOUNDARY 17 |
| | BOUNDARY HEADER OF BOUNDARY 18 |
| | BOUNDARY HEADER OF BOUNDARY 19 |
| | BOUNDARY HEADER OF BOUNDARY 20 |

FIG. 8B

812 {
| |
|---|
| TRAJECTORY INFORMATION@Y = 2<br>{BOUNDARY 8(2), BOUNDARY 9(2), BOUNDARY 10(2), BOUNDARY 2(2),<br>BOUNDARY 11(2), BOUNDARY 12(2), BOUNDARY 5(2), BOUNDARY 13(2)} |
| TRAJECTORY INFORMATION@Y = 3<br>{BOUNDARY 8(3), BOUNDARY 9(3), BOUNDARY 10(3), BOUNDARY 2(3),<br>BOUNDARY 11(3), BOUNDARY 12(3), BOUNDARY 5(3)} |
| TRAJECTORY INFORMATION@Y = 4<br>{BOUNDARY 8(4), BOUNDARY 9(4), BOUNDARY 10(4), BOUNDARY 2(4),<br>BOUNDARY 11(4), BOUNDARY 12(4), BOUNDARY 5(4)} |
| TRAJECTORY INFORMATION@Y = 5<br>{BOUNDARY 8(5), BOUNDARY 9(5), BOUNDARY 10(5), BOUNDARY 2(5),<br>BOUNDARY 11(5), BOUNDARY 12(5), BOUNDARY 5(5)} |
| TRAJECTORY INFORMATION@Y = 6<br>{BOUNDARY 8(6), BOUNDARY 9(6), BOUNDARY 10(6), BOUNDARY 2(6),<br>BOUNDARY 11(6), BOUNDARY 12(6)} |
| TRAJECTORY INFORMATION@Y = 7<br>{BOUNDARY 8(7), BOUNDARY 2(7)} |
| TRAJECTORY INFORMATION@Y = 8<br>{BOUNDARY 8(8), BOUNDARY 14(8), BOUNDARY 15(8), BOUNDARY 16(8),<br>BOUNDARY 17(8), BOUNDARY 2(8), BOUNDARY 18(8), BOUNDARY 19(8)} |
| TRAJECTORY INFORMATION@Y = 9<br>{BOUNDARY 14(9), BOUNDARY 15(9), BOUNDARY 16(9), BOUNDARY 17(9),<br>BOUNDARY 2(9), BOUNDARY 18(9), BOUNDARY 19(9), BOUNDARY 20(9)} |
| TRAJECTORY INFORMATION@Y = 10<br>{BOUNDARY 14(10), BOUNDARY 15(10), BOUNDARY 16(10), BOUNDARY 17(10),<br>BOUNDARY 2(10), BOUNDARY 18(10), BOUNDARY 19(10), BOUNDARY 20(10)} |
| TRAJECTORY INFORMATION@Y = 11<br>{BOUNDARY 15(11), BOUNDARY 16(11), BOUNDARY 17(11), BOUNDARY 2(11),<br>BOUNDARY 18(11), BOUNDARY 19(11), BOUNDARY 20(11)} |
| TRAJECTORY INFORMATION@Y = 12<br>{BOUNDARY 15(12), BOUNDARY 16(12), BOUNDARY 17(12), BOUNDARY 2(12),<br>BOUNDARY 18(12), BOUNDARY 19(12), BOUNDARY 20(12)} |
| TRAJECTORY INFORMATION@Y = 13<br>{BOUNDARY 16(13), BOUNDARY 17(13), BOUNDARY 2(13), BOUNDARY 18(13),<br>BOUNDARY 19(13), BOUNDARY 20(13)} |
| TRAJECTORY INFORMATION@Y = 14<br>{BOUNDARY 16(14), BOUNDARY 17(14), BOUNDARY 2(14), BOUNDARY 18(14),<br>BOUNDARY 19(14), BOUNDARY 20(14)} |

F I G. 15A

| BOUNDARY COUNT (E) | | 21 |
|---|---|---|
| BOUNDARY HEADER OF BOUNDARY 0 | ATTRIBUTE | SINGLE PIXEL VALUE |
| | PIXEL VALUE OF REGION | 0xAAAAAA |
| | HEAD Y-COORDINATE | 0 |
| | START X-COORDINATE | 0 |
| | END Y-COORDINATE | 1 |
| BOUNDARY HEADER OF BOUNDARY 1 | ATTRIBUTE | SINGLE PIXEL VALUE |
| | PIXEL VALUE OF REGION | 0x00FF00 |
| | HEAD Y-COORDINATE | 0 |
| | START X-COORDINATE | 2 |
| | END Y-COORDINATE | 1 |
| BOUNDARY HEADER OF BOUNDARY 2 | ATTRIBUTE | LOSSY ENCODING |
| | PIXEL VALUE OF REGION | ABSENT |
| | HEAD Y-COORDINATE | 0 |
| | START X-COORDINATE | 4 |
| | END Y-COORDINATE | 15 |
| BOUNDARY HEADER OF BOUNDARY 3 | ATTRIBUTE | SINGLE PIXEL VALUE |
| | PIXEL VALUE OF REGION | 0xAAAAAA |
| | HEAD Y-COORDINATE | 0 |
| | START X-COORDINATE | 6 |
| | END Y-COORDINATE | 1 |
| BOUNDARY HEADER OF BOUNDARY 4 | ATTRIBUTE | SINGLE PIXEL VALUE |
| | PIXEL VALUE OF REGION | 0x00FF00 |
| | HEAD Y-COORDINATE | 0 |
| | START X-COORDINATE | 8 |
| | END Y-COORDINATE | 1 |
| BOUNDARY HEADER OF BOUNDARY 5 | ATTRIBUTE | LOSSY ENCODING |
| | PIXEL VALUE OF REGION | ABSENT |
| | HEAD Y-COORDINATE | 0 |
| | START X-COORDINATE | 10 |
| | END Y-COORDINATE | 5 |
| BOUNDARY HEADER OF BOUNDARY 6 | ATTRIBUTE | SINGLE PIXEL VALUE |
| | PIXEL VALUE OF REGION | 0xAAAAAA |
| | HEAD Y-COORDINATE | 0 |
| | START X-COORDINATE | 12 |
| | END Y-COORDINATE | 1 |
| BOUNDARY HEADER OF BOUNDARY 7 | ATTRIBUTE | SINGLE PIXEL VALUE |
| | PIXEL VALUE OF REGION | 0x00FF00 |
| | HEAD Y-COORDINATE | 0 |
| | START X-COORDINATE | 14 |
| | END Y-COORDINATE | 1 |

F I G. 15B

| | ATTRIBUTE | LOSSY ENCODING |
|---|---|---|
| BOUNDARY HEADER OF BOUNDARY 8 | ATTRIBUTE | LOSSY ENCODING |
| | PIXEL VALUE OF REGION | ABSENT |
| | HEAD Y-COORDINATE | 1 |
| | START X-COORDINATE | 0 |
| | END Y-COORDINATE | 9 |
| BOUNDARY HEADER OF BOUNDARY 9 | ATTRIBUTE | SINGLE PIXEL VALUE |
| | PIXEL VALUE OF REGION | 0x880000 |
| | HEAD Y-COORDINATE | 2 |
| | START X-COORDINATE | 2 |
| | END Y-COORDINATE | 7 |
| BOUNDARY HEADER OF BOUNDARY 10 | ATTRIBUTE | SINGLE PIXEL VALUE |
| | PIXEL VALUE OF REGION | 0x000044 |
| | HEAD Y-COORDINATE | 2 |
| | START X-COORDINATE | 4 |
| | END Y-COORDINATE | 7 |
| BOUNDARY HEADER OF BOUNDARY 11 | ATTRIBUTE | SINGLE PIXEL VALUE |
| | PIXEL VALUE OF REGION | 0x880000 |
| | HEAD Y-COORDINATE | 2 |
| | START X-COORDINATE | 8 |
| | END Y-COORDINATE | 7 |
| BOUNDARY HEADER OF BOUNDARY 12 | ATTRIBUTE | SINGLE PIXEL VALUE |
| | PIXEL VALUE OF REGION | 0x000044 |
| | HEAD Y-COORDINATE | 2 |
| | START X-COORDINATE | 10 |
| | END Y-COORDINATE | 7 |
| BOUNDARY HEADER OF BOUNDARY 13 | ATTRIBUTE | SINGLE PIXEL VALUE |
| | PIXEL VALUE OF REGION | 0x880000 |
| | HEAD Y-COORDINATE | 2 |
| | START X-COORDINATE | 14 |
| | END Y-COORDINATE | 3 |
| BOUNDARY HEADER OF BOUNDARY 14 | ATTRIBUTE | SINGLE PIXEL VALUE |
| | PIXEL VALUE OF REGION | 0x00FF00 |
| | HEAD Y-COORDINATE | 8 |
| | START X-COORDINATE | 2 |
| | END Y-COORDINATE | 9 |
| BOUNDARY HEADER OF BOUNDARY 15 | ATTRIBUTE | LOSSY ENCODING |
| | PIXEL VALUE OF REGION | ABSENT |
| | HEAD Y-COORDINATE | 8 |
| | START X-COORDINATE | 4 |
| | END Y-COORDINATE | 11 |

F I G. 15C

| | | |
|---|---|---|
| BOUNDARY HEADER OF BOUNDARY 16 | ATTRIBUTE | SINGLE PIXEL VALUE |
| | PIXEL VALUE OF REGION | 0x808080 |
| | HEAD Y-COORDINATE | 8 |
| | START X-COORDINATE | 6 |
| | END Y-COORDINATE | 13 |
| BOUNDARY HEADER OF BOUNDARY 17 | ATTRIBUTE | SINGLE PIXEL VALUE |
| | PIXEL VALUE OF REGION | 0x00FF00 |
| | HEAD Y-COORDINATE | 8 |
| | START X-COORDINATE | 8 |
| | END Y-COORDINATE | 15 |
| BOUNDARY HEADER OF BOUNDARY 18 | ATTRIBUTE | SINGLE PIXEL VALUE |
| | PIXEL VALUE OF REGION | 0x808080 |
| | HEAD Y-COORDINATE | 8 |
| | START X-COORDINATE | 12 |
| | END Y-COORDINATE | 15 |
| BOUNDARY HEADER OF BOUNDARY 19 | ATTRIBUTE | SINGLE PIXEL VALUE |
| | PIXEL VALUE OF REGION | 0x00FF00 |
| | HEAD Y-COORDINATE | 8 |
| | START X-COORDINATE | 14 |
| | END Y-COORDINATE | 15 |
| BOUNDARY HEADER OF BOUNDARY 20 | ATTRIBUTE | LOSSY ENCODING |
| | PIXEL VALUE OF REGION | ABSENT |
| | HEAD Y-COORDINATE | 9 |
| | START X-COORDINATE | 15 |
| | END Y-COORDINATE | 15 |
| BOUNDARY-SPECIFIC TRAJECTORY INFORMATION OF BOUNDARY 0 | | +1 |
| BOUNDARY-SPECIFIC TRAJECTORY INFORMATION OF BOUNDARY 1 | | +1 |
| BOUNDARY-SPECIFIC TRAJECTORY INFORMATION OF BOUNDARY 2 | | +1,+1,+1,+1,+1,+1,+1,−1,−1,−1,−1,−1,−1,−1,−1 |
| BOUNDARY-SPECIFIC TRAJECTORY INFORMATION OF BOUNDARY 3 | | +1 |
| BOUNDARY-SPECIFIC TRAJECTORY INFORMATION OF BOUNDARY 4 | | +1 |
| BOUNDARY-SPECIFIC TRAJECTORY INFORMATION OF BOUNDARY 5 | | +1,+1,+1,+1,+1 |
| BOUNDARY-SPECIFIC TRAJECTORY INFORMATION OF BOUNDARY 6 | | +1 |
| BOUNDARY-SPECIFIC TRAJECTORY INFORMATION OF BOUNDARY 7 | | +1 |

FIG. 15D

| | |
|---|---|
| BOUNDARY-SPECIFIC TRAJECTORY INFORMATION OF BOUNDARY 8 | 0,0,0,0,0,0,0,0 |
| BOUNDARY-SPECIFIC TRAJECTORY INFORMATION OF BOUNDARY 9 | +1,+1,+1,+1,+1 |
| BOUNDARY-SPECIFIC TRAJECTORY INFORMATION OF BOUNDARY 10 | +1,+1,+1,+1,+1 |
| BOUNDARY-SPECIFIC TRAJECTORY INFORMATION OF BOUNDARY 11 | +1,+1,+1,+1,+1 |
| BOUNDARY-SPECIFIC TRAJECTORY INFORMATION OF BOUNDARY 12 | +1,+1,+1,+1,+1 |
| BOUNDARY-SPECIFIC TRAJECTORY INFORMATION OF BOUNDARY 13 | +1 |
| BOUNDARY-SPECIFIC TRAJECTORY INFORMATION OF BOUNDARY 14 | −1,−1,0 |
| BOUNDARY-SPECIFIC TRAJECTORY INFORMATION OF BOUNDARY 15 | −1,−1,−1,−1,0 |
| BOUNDARY-SPECIFIC TRAJECTORY INFORMATION OF BOUNDARY 16 | −1,−1,−1,−1,−1,−1,0 |
| BOUNDARY-SPECIFIC TRAJECTORY INFORMATION OF BOUNDARY 17 | −1,−1,−1,−1,−1,−1,−1 |
| BOUNDARY-SPECIFIC TRAJECTORY INFORMATION OF BOUNDARY 18 | −1,−1,−1,−1,−1,−1,−1 |
| BOUNDARY-SPECIFIC TRAJECTORY INFORMATION OF BOUNDARY 19 | −1,−1,−1,−1,−1,−1,−1 |
| BOUNDARY-SPECIFIC TRAJECTORY INFORMATION OF BOUNDARY 20 | −1,−1,−1,−1,−1,−1 |

ENCODING DEVICE, ENCODING METHOD, DECODING DEVICE, DECODING METHOD, AND GENERATION METHOD

BACKGROUND OF THE INVENTION

Field of the Invention

The present invention relates to an encoding device, an encoding method, a decoding device, a decoding method, and a generation method.

Description of the Related Art

PDL (Page Description Language) has widely proliferated as a method of expressing an image using the trajectories of boundaries and the colors of regions. The PDL expresses an image as a set of graphic objects. Each graphic object is expressed by a boundary that forms an outline and a color. To print an image described in PDL by a printing device, a technique of converting, by software processing, the PDL into an intermediate language suitable for hardware processing and then converting the intermediate language into a raster image by hardware has proliferated.

For example, Japanese Patent Laid-Open No. 2000-149035 discloses a method of generating a raster image from image data (intermediate data) formed by a set of graphic objects each expressed by boundary information and paint information. The boundary information includes information that identifies a formula used to calculate a trajectory (coordinates), and the parameters of the formula. The image data includes layer information representing the vertical relationship of overlapping graphic objects in addition to the boundary information and the paint information. A raster image is generated in the following way. The x-coordinates of the boundaries of each graphic object are calculated for each line of the image. The pixel value between adjacent boundaries is obtained by referring to the paint information of a corresponding graphic object. If a plurality of graphic objects overlap between the same boundaries, the vertical relationship is obtained by referring to the layer information, and the paint information of the graphic object located in the uppermost layer (front surface) is referred to. If the paint information has transparency, the paint information of the graphic object in the lower layer (rear surface) is referred to. A calculation to blend the pixel values of the plurality of graphic objects is performed. Of the boundary information, for a boundary that does not end in the line for which the pixel is generated, and is used in the next line, the x-coordinate in a case in which the y-coordinate is incremented is calculated by referring to the parameters. Pieces of boundary information of all the graphic objects processed in the line are sorted in ascending order of calculated x-coordinates and stored for processing of the next line. The above-described procedure is repeated for each line, thereby generating a raster image.

However, if the image described in the PDL includes a graphic object with a complex shape or includes an enormous number of graphic objects, the intermediate language also includes a number of boundary data, and the data amount and the memory capacity needed for decoding increase. In some cases, some or all of graphic objects are converted into raster images by software processing, and an intermediate language including the raster images is generated to decrease the data amount and the memory capacity needed for decoding. At this time, the raster images included in the intermediate language are compressed. The compression is performed using lossless encoding to avoid deterioration of the graphic images. As a lossless encoding method suitable to compress a graphic image, a lossless encoding technique of regarding a raster image as a set of regions each formed from adjacent pixels of the same color and performing encoding using the trajectories of the boundaries between regions and pixel values is used.

It is also considered to use an encoding technique of selectively using lossy encoding and lossless encoding on a region basis to make the data amount smaller without damaging image quality. In such encoding, the trajectory of the boundary of each region, an attribute representing whether the region corresponding to the boundary is a lossily encoded region or a losslessly encoded region, encoded data obtained by lossily encoding a raster image, and the pixel value of a losslessly encoded region are included in the encoded data.

SUMMARY OF THE INVENTION

In the above-described encoding technique, however, the efficiency of memory transfer upon decoding may lower. Alternatively, the capacity of the memory used in decoding may increase, and the scale of hardware may become large.

An aspect of the present invention provides an image processing technique capable of reducing the scale of hardware or increasing the efficiency of memory transfer.

An aspect of the present invention has the following arrangement.

An encoding device comprising: a dividing unit configured to divide an encoding unit of an image into a plurality of regions; a header generation unit configured to generate, for each boundary that partitions each of the plurality of regions along a direction which crosses a line, a boundary header used to identify the boundary; a trajectory generation unit configured to generate a piece of trajectory information representing a displacement of the boundary associated with progress of a line; and an aligning unit configured to, when generating encoded data including generated boundary headers and generated pieces of trajectory information, change, in accordance with the number of boundaries, a manner in which the generated boundary headers and the generated pieces of trajectory information are aligned.

According to an exemplary aspect of the present invention, it is possible to provide an image processing technique capable of reducing the scale of hardware or increasing the efficiency of memory transfer.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A-7C are views showing pieces of boundary information representing the boundaries in FIG. 6 by numerical values;

FIGS. 8A and 8B are views showing encoded data obtained by aligning the pieces of boundary information shown in FIGS. 7A-7C;

FIGS. 15A-15D are views showing the numerical data of the boundaries in a case in which each region without hatching in the rectangular region shown in FIG. 4 is regarded as a region formed by combining regions of different pixel values.

DESCRIPTION OF THE EMBODIMENTS

Figure 1:
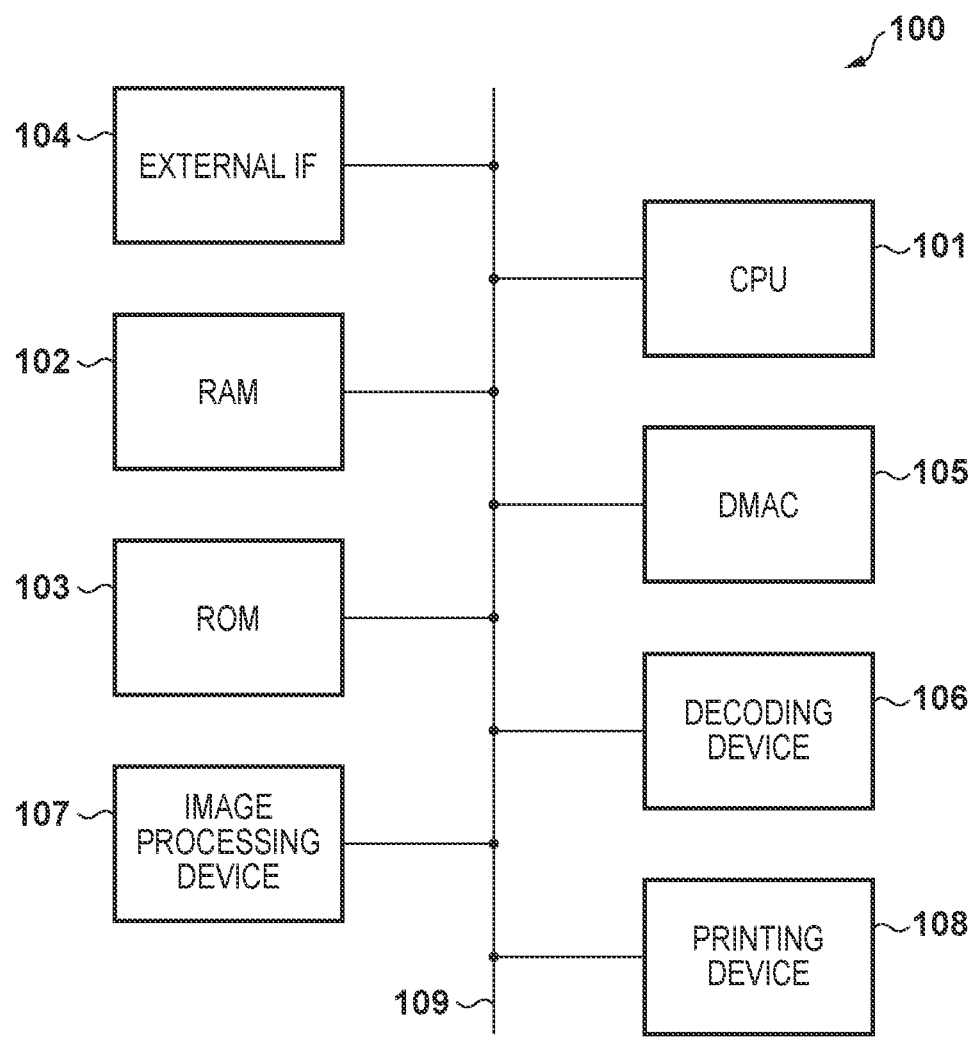
FIG. 1 is a block diagram showing the hardware arrangement of an image processing system according to an embodiment.

An embodiment of the present invention will now be described with reference to the accompanying drawings. However, the embodiment of the present invention is not limited to the following embodiment. Same or similar constituent elements, members, and processes shown in the drawings are denoted by the same reference numerals, and a repetitive description thereof will appropriately be omitted. In the drawings, some members that are not important for the description are not illustrated.

As a technique of regarding a raster image as a set of regions each formed from a plurality of adjacent pixels performing encoding using the trajectories of the boundaries between the regions and pixel values, and decoding thus encoded data, the present applicant proposes a technique described in Japanese Patent Application No. 2016-077580. There is disclosed a method of decoding encoded data that is encoded by dividing an image into regions each formed from adjacent pixels and performing encoding by expressing each region by the start point and the amount of displacement of the boundary and the attribute of the region. In the encoded data, the sign of the amount of displacement of each boundary is sequentially recorded next to a header including the start point coordinate and the end point coordinate of the boundary and the attribute of the region surrounded by the boundary. The attribute represents whether the region is a lossily encoded region including pixels of different colors or a region formed from pixels of a single color. If the region is a region formed from pixels of a single color, the pixel value is included. The headers are sorted in the order of the coordinates of the start points, and the signs of the amounts of displacement are sorted in the order of the coordinates of the boundaries of the application target. In the technique described in the above literature, an image of one page in A4 size or the like is divided into rectangular images each including a smaller number of pixels, and encoding and decoding are performed for each rectangular image. Encoded data is decoded sequentially from the first line to the final line. When decoding each line, boundary data with a start point on the line is read out, and the difference in the x-coordinate from an adjacent boundary is calculated. If the attribute read out from the header represents a region formed out from pixels of a single color, a pixel value read out from the header is output in accordance with the difference in the x-coordinate obtained by the calculation. If the attribute read out from the header represents a lossily encoded region including pixels of different colors, a pixel output from a decoding means of the lossily encoded data is output in accordance with the difference in the x-coordinate. This processing is performed for one line, thereby decoding the image of one line. As for the boundary data, if the end point does not exist on the line, an x-coordinate in a case in which the y-coordinate of the boundary data is incremented is calculated from the coordinates and the amount of displacement of the boundary data on the line and stored for decoding of the next line.

In the method described in the above literature, if the values of pixels on a line are different, all the pixels on the line are boundaries. Hence, the upper limit of the number of pieces of boundary information is the number of pixels of the rectangular image. In addition, since the regions do not overlap, encoded data is formed from pieces of boundary information and information representing the number of pieces of boundary information. The size of the encoded data is also determined by the number of pixels of the rectangular image.

The present inventor recognized the following problems of the method described in the above literature. In the method described in the above literature, when decoding encoded data in which the sign of the amount of displacement follows the header of each boundary, loading of the encoded data is done by randomly accessing a memory. Hence, the efficiency of memory transfer can lower. Alternatively, to avoid the random access, the decoding means may be provided with a memory configured to buffer the headers of all boundaries included in the encoded data. In this case, the scale of hardware can increase.

In this embodiment, for the sake of simplicity of explanation, an example in which an image is divided into regions each formed from adjacent pixels of the same color will be described. However, the technical concept according to this embodiment can also be applied to a case in which a lossily encoded region including a plurality of pixels of different colors and a region formed from pixels of a single color coexist, as is obvious for those who are skilled in the art and who read this specification.

FIG. 1 is a block diagram showing the hardware arrangement of an image processing system 100 according to an embodiment. The image processing system 100 is directed to an image data encoding technique and a decoding technique, and is particularly directed to a lossless encoding technique of dividing image data into color-separated regions and performing encoding using the trajectories of the boundaries between the regions and pixel values and a decoding technique. The image processing system 100 includes a CPU 101, a RAM 102, a ROM 103, an external IF 104, a DMAC 105, a decoding device 106, an image processing device 107, a printing device 108, and an interconnect 109.

The CPU 101 controls the entire system 100. The RAM 102 is formed by a memory controller and a DRAM, and is used to load a program that operates in the CPU 101 and also used as the work memory of the CPU 101 and a processing device that operates on the system 100. The ROM 103 stores a program that operates in the CPU 101. The external IF 104 transmits/receives data to/from an external device. The external IF 104 is an IF (InterFace) such as Ethernet or USB. Under the control of the CPU 101, the DMAC 105 causes each of the external IF 104, the decoding device 106, the image processing device 107, and the printing device 108 to transmit/receive encoded data, decoded image data, or print image data to/from the RAM 102. The decoding device 106 decodes encoded data to generate decoded image data. The image processing device 107 processes decoded image data such that it matches the characteristic of the printing device 108, and converts the decoded image data according to the input data format of the printing device 108, thereby generating print image data. The printing device 108 fixes toner or ink to a printing medium such as a sheet surface based on print image data that is electronic information, thereby forming an image on the sheet surface. The interconnect 109 intervenes between the CPU 101, the RAM 102, the ROM 103, the external IF 104, the DMAC 105, the decoding device 106, the image processing device 107, and the printing device 108 and connects them to each other. The interconnect 109 is a data transfer path formed by, for example, a shared bus and switches.

In the image processing system 100, an encoding device such as an external host computer (not shown in FIG. 1) encodes image data to generate encoded data, and the external IF 104 receives the encoded data. The encoded data is held by the RAM 102 under the control of the CPU 101 until it is decoded. Alternatively, the external IF 104 may receive image data, and the CPU 101 may encode the image data. In this case, the image processing system 100 includes an encoding device.

Figure 2:
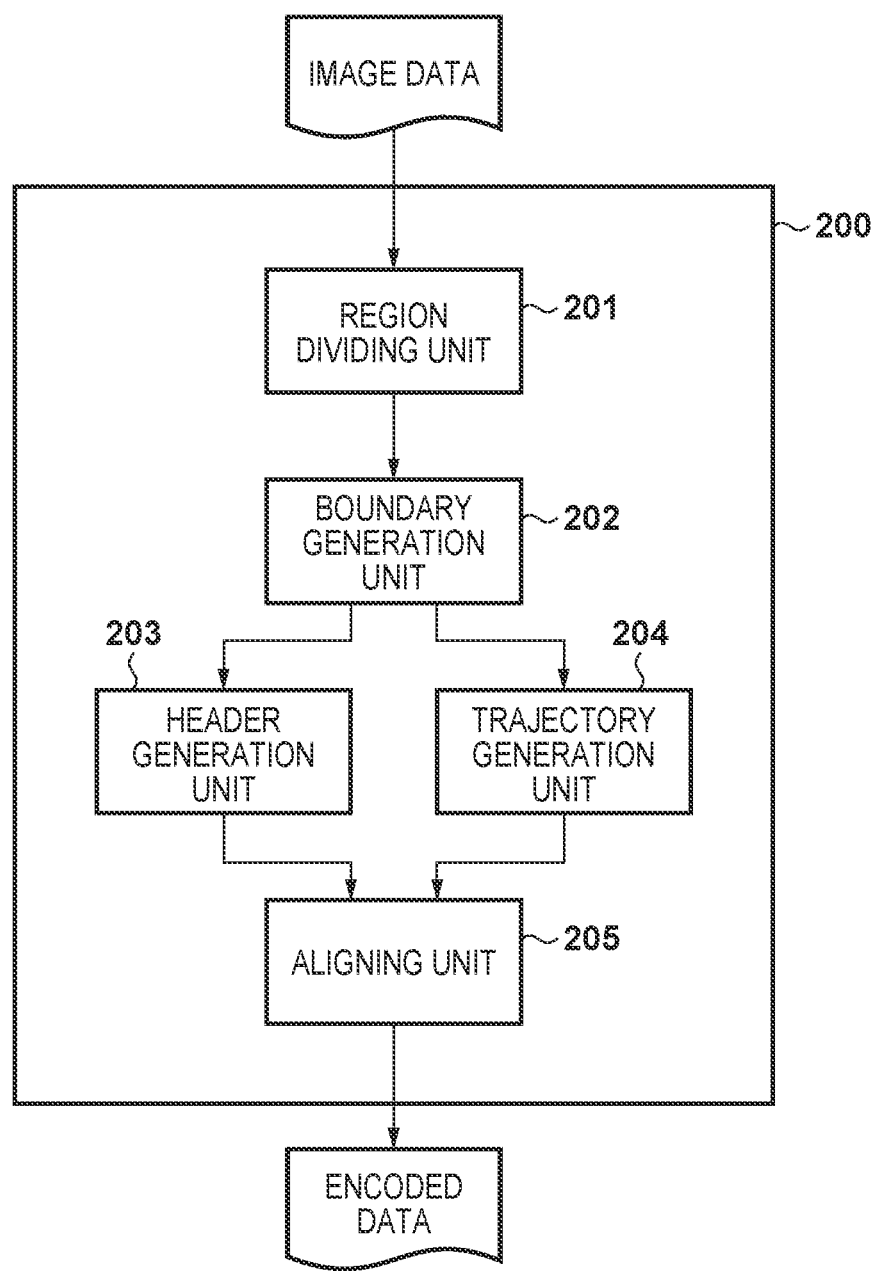
FIG. 2 is a block diagram showing the functions and arrangement of an encoding device.

FIG. 2 is a block diagram showing the functions and arrangement of an encoding device 200. The encoding device 200 acquires image data representing an image, and encodes the acquired image data to generate encoded data. The encoding device 200 encodes the image data for each predetermined encoding unit. The encoding unit may be a group of pixels or an image region to be encoded all at once by the encoding device. The encoding unit may be, for example, 4×4 pixels, 8×8 pixels, 16×16 pixels, 32×32 pixels, or 64×64 pixels. For the sake of simplicity of explanation, a case in which image data of 16×16 pixels is employed as the encoding unit, and the encoding unit is encoded and decoded will be described as an example. However, the embodiment is not limited to 16×16 pixels.

The encoding target image data is divided into rectangular regions (encoding units) each formed from 16×16 pixels before input to the encoding device 200. The rectangular regions obtained as the result of division are input to the encoding device 200 in accordance with a predetermined order. If the size of the image data is not an integer multiple of 16×16 pixels, padding pixels are added to the right and lower ends such that the size becomes an integer multiple of 16×16 pixels. After that, the image data is divided into rectangular regions.

A region dividing unit 201 divides a rectangular region of 16×16 pixels input to the encoding device 200 into a plurality of color-separated regions by the pixel color. The color-separated region is a region formed from adjacent pixels of the same color. A boundary generation unit 202 generates boundary information representing a boundary that partitions the color-separated regions obtained as the result of division by the region dividing unit 201 along a direction which crosses a line. For example, the boundary generation unit 202 generates boundary information from a set of the coordinates of pixels at the left ends of the color-separated regions and the pixel values (colors) of the color-separated regions. A header generation unit 203 generates, for each boundary, a boundary header used to identify the boundary. Each boundary header includes the coordinates of the two ends of a corresponding boundary and the pixel value of a corresponding region. For example, the header generation unit 203 generates a boundary header from the x- and y-coordinates of the start point of boundary information generated by the boundary generation unit 202, the y-coordinate of the end point, and the pixel value of a color-separated region corresponding to the boundary represented by the boundary information. The coordinates of the boundary included in the boundary information represent the position of the boundary. A trajectory generation unit 204 generates trajectory information representing a displacement of the boundary associated with progress of a line. For example, the trajectory generation unit 204 refers to boundary information generated by the boundary generation unit 202, and calculates, for each boundary and each line, the X-direction displacement (offset) of each boundary between two lines adjacent in the Y direction. The trajectory generation unit 204 generates trajectory information including a set of displacements obtained as the result of calculation. When generating encoded data including the boundary headers generated by the header generation unit 203 and the pieces of trajectory information generated by the trajectory generation unit 204, an aligning unit 205 changes, in accordance with the number of boundaries, a manner in which the boundary headers and the pieces of trajectory information are aligned. For example, the aligning unit 205 aligns the boundary headers and the pieces of trajectory information in accordance with a rule to be described later.

Each of the region dividing unit 201, the boundary generation unit 202, the header generation unit 203, the trajectory generation unit 204, and the aligning unit 205 may be implemented by software executed by a general-purpose processor and a processor. Alternatively, each unit may be implemented by dedicated hardware. Hence, the encoding device 200 may be implemented by software executed by a general-purpose processor and a processor, or may be implemented by dedicated hardware. Alternatively, the encoding device 200 may be implemented by combining a general-purpose processor and dedicated hardware.

Figure 3:
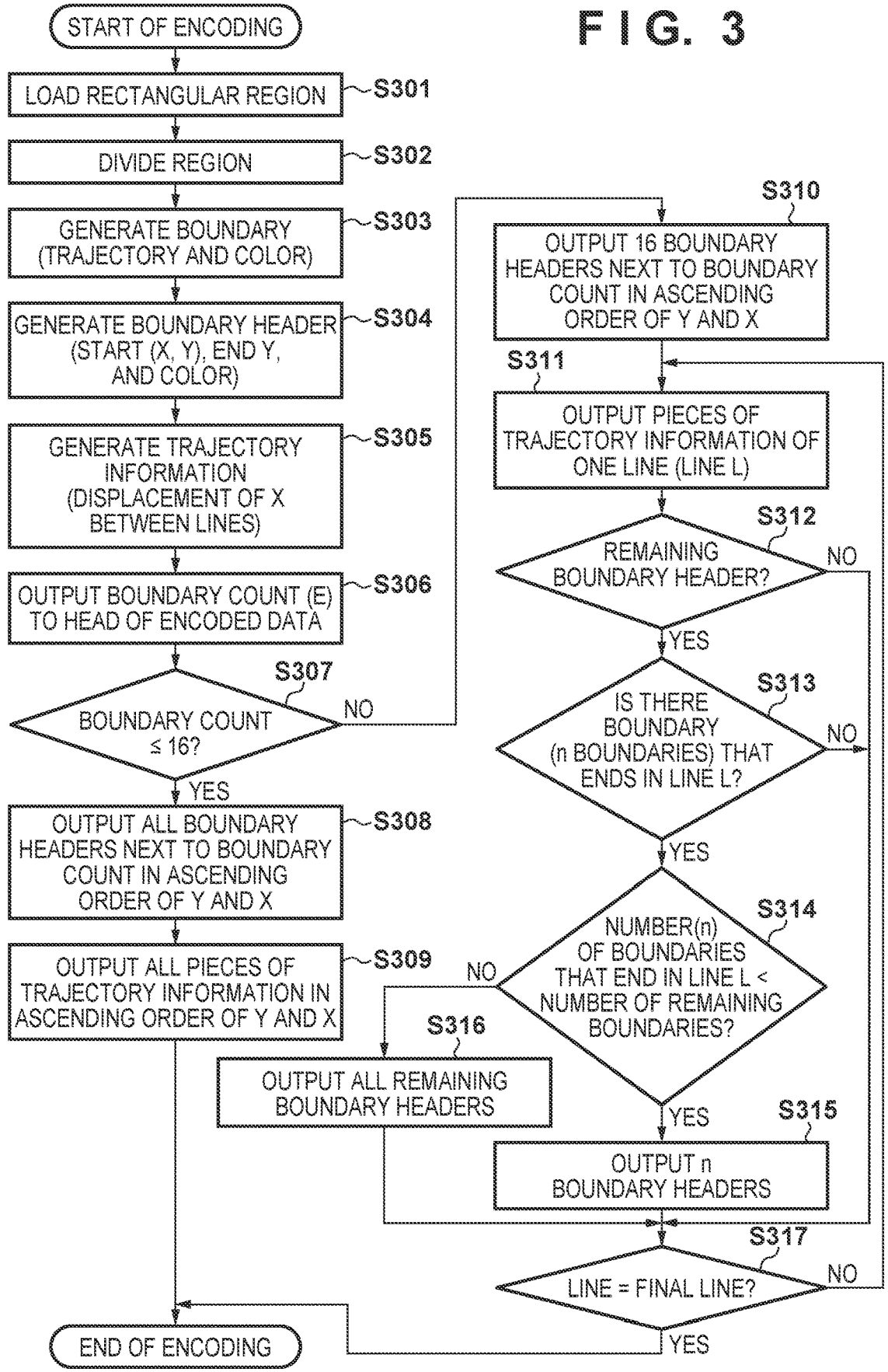
FIG. 3 is a flowchart showing the procedure of encoding processing of the encoding device shown in FIG. 2.
Figure 4:
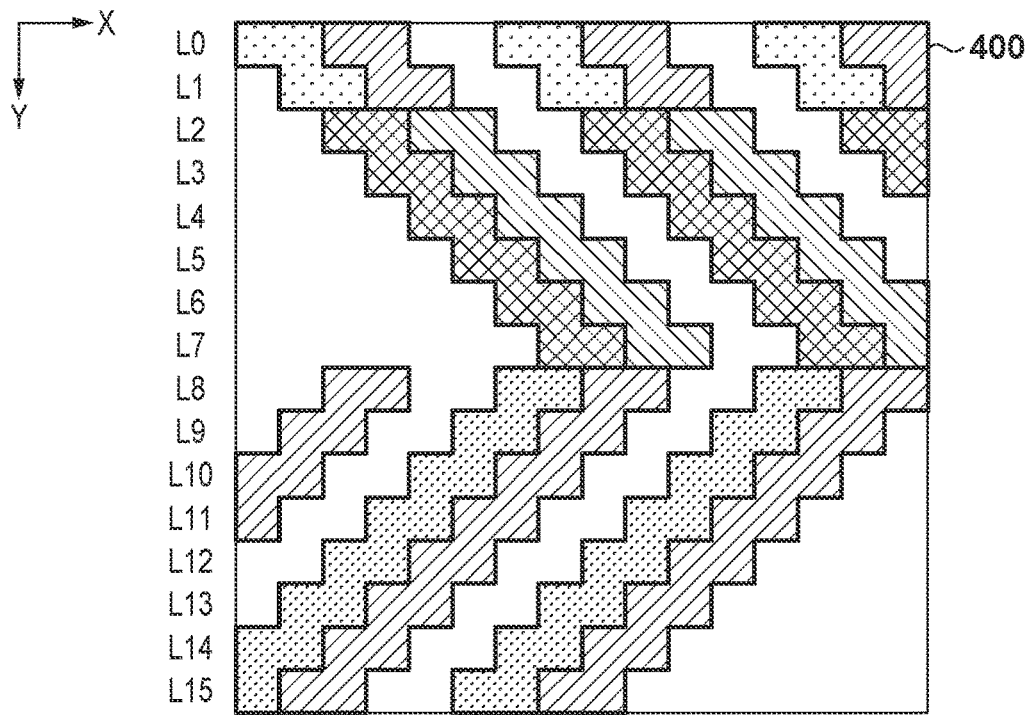
FIG. 4 is a view showing an example of a rectangular region input to the encoding device shown in FIG. 2.
Figure 5:
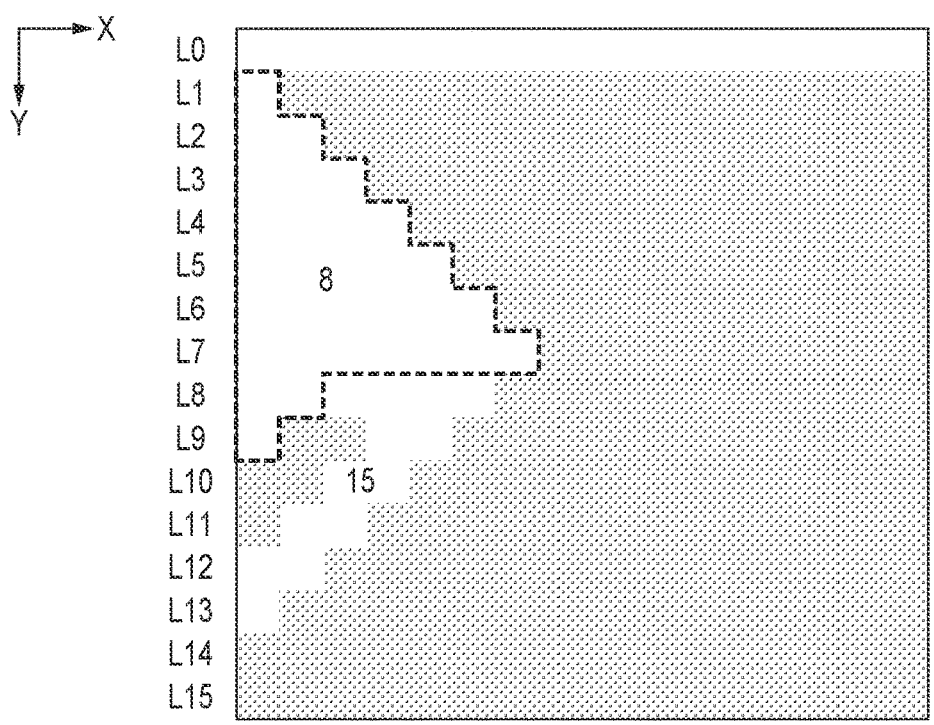
FIG. 5 is a view showing another example of the rectangular region input to the encoding device shown in FIG. 2.
Figure 6:
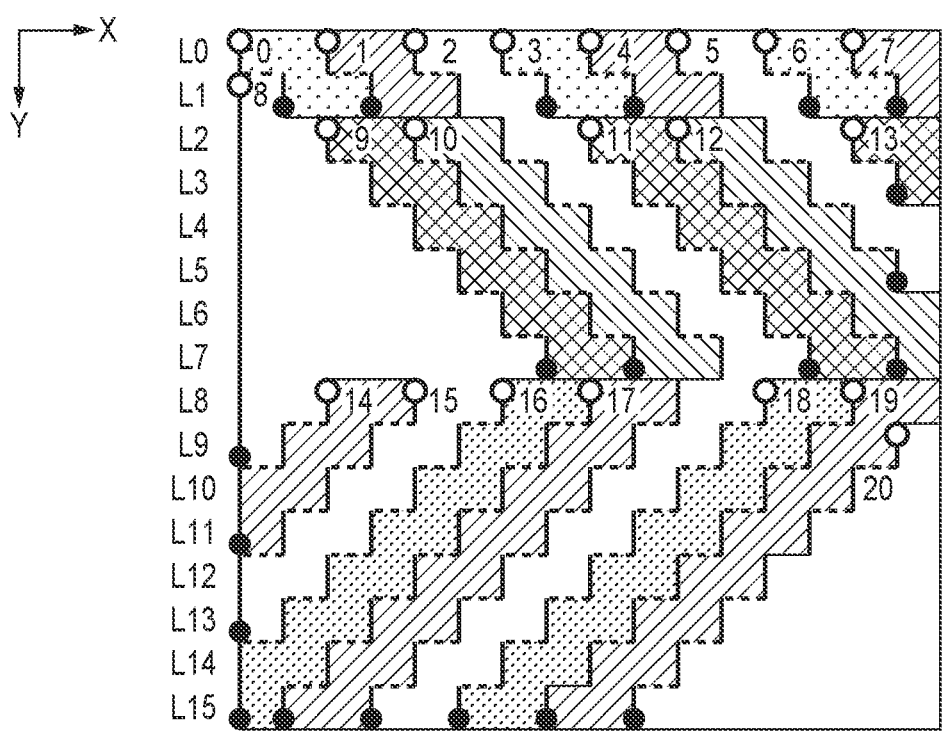
FIG. 6 is a view showing color-separated regions generated from the rectangular region shown in FIG. 4 and the boundaries between the color-separated regions.

Encoding processing of the encoding device 200 shown in FIG. 2 will be described below with reference to FIGS. 3 to 8B. FIG. 3 is a flowchart showing the procedure of encoding processing of the encoding device 200 shown in FIG. 2. FIG. 4 is a view showing an example of a rectangular region input to the encoding device 200 shown in FIG. 2. FIG. 5 is a view showing another example of the rectangular region input to the encoding device 200 shown in FIG. 2. FIG. 6 is a view showing color-separated regions generated from the rectangular region shown in FIG. 4 and the boundaries between the color-separated regions. FIGS. 7A-7C are views showing pieces of boundary information representing the boundaries in FIG. 6 by numerical values. FIGS. 8A and 8B are views showing encoded data obtained by aligning the pieces of boundary information shown in FIGS. 7A-7C.

The encoding device 200 loads a rectangular region 400 of 16×16 pixels obtained by dividing an encoding target image (step S301). In the rectangular region 400, each hatching pattern corresponds to the pixel value of a color-separated region. That is, if two color-separated regions have the same hatching pattern, the color-separated regions have the same color. If the patterns are different, the colors are different.

Referring to FIGS. 4, 5, and 6, each of lines L0 to L15 represents a line formed from 16 pixels arranged in a direction along which the line extends, that is, in the horizontal direction (X direction). The region dividing unit 201 scans each of the lines L0 to L15 from left to right and divides it into color-separated regions each formed from a plurality of pixels that are adjacent to each other and have the same pixel value. If there exists a pixel that is not adjacent to a pixel having the same pixel value, the region dividing unit 201 may obtains the pixel as one color-separated region. Each color-separated region of a given line is stored in the internal storage area of the encoding device 200 and referred to when processing the next line.

The first line L0 of the rectangular region 400 is divided into the following eight color-separated regions.

Color-separated region 0 of the 0th pixel (0, 0) and the first pixel (1, 0)

Color-separated region 1 of the second pixel (2, 0) and the third pixel (3, 0)

Color-separated region 2 of the fourth pixel (4, 0) and the fifth pixel (5, 0)

Color-separated region 3 of the sixth pixel (6, 0) and the seventh pixel (7, 0)

Color-separated region 4 of the eighth pixel (8, 0) and the ninth pixel (9, 0)

Color-separated region 5 of the 10th pixel (10, 0) and the 11th pixel (11, 0)

Color-separated region 6 of the 12th pixel (12, 0) and the 13th pixel (13, 0)

Color-separated region 7 of the 14th pixel (14, 0) and the 15th pixel (15, 0)

The next line L1 of the rectangular region 400 is first divided into the following nine color-separated regions.

Color-separated region 8' of the 0th pixel (0, 1)

Color-separated region 9' of the first pixel (1, 1) and the second pixel (2, 1)

Color-separated region 10' of the third pixel (3, 1) and the fourth pixel (4, 1)

Color-separated region 11' of the fifth pixel (5, 1) and the sixth pixel (6, 1)

Color-separated region 12' of the seventh pixel (7, 1) and the eighth pixel (8, 1)

Color-separated region 13' of the ninth pixel (9, 1) and the 10th pixel (10, 1)

Color-separated region 14' of the 11th pixel (11, 1) and the 12th pixel (12, 1)

Color-separated region 15' of the 13th pixel (13, 1) and the 14th pixel (14, 1)

Color-separated region 16' of the 15th pixel (15, 1)

Next, color-separated regions 8' to 16' are compared with color-separated regions 0 to 7 obtained from the preceding line L0, and color-separated regions that are adjacent and have the same colors are integrated into color-separated regions 0 to 7 obtained from the preceding line L0. If a color-separated region of the line L0 and a color-separated region of the line L1 are adjacent, this means that these color-separated regions include pixels with the same x-coordinate. As a result, the following color-separated regions are generated.

Color-separated region 0: pixel (0, 0), pixel (1, 0), pixel (1, 1), pixel (2, 1)

Color-separated region 1: pixel (2, 0), pixel (3, 0), pixel (3, 1), pixel (4, 1)

Color-separated region 2: pixel (4, 0), pixel (5, 0), pixel (5, 1), pixel (6, 1)

Color-separated region 3: pixel (6, 0), pixel (7, 0), pixel (7, 1), pixel (8, 1)

Color-separated region 4: pixel (8, 0), pixel (9, 0), pixel (9, 1), pixel (10, 1)

Color-separated region 5: pixel (10, 0), pixel (11, 0), pixel (11, 1), pixel (12, 1)

Color-separated region 6: pixel (12, 0), pixel (13, 0), pixel (13, 1), pixel (14, 1)

Color-separated region 7: pixel (14, 0), pixel (15, 0), pixel (15, 1)

Color-separated region 8: pixel (0, 1)

The subsequent lines L2 to L15 are also processed in the same way (step S302).

However, if a plurality of color-separated regions having the same pixel value exist on a certain line, and all of the plurality of color-separated regions are adjacent to one color-separated region of the same color on the immediately preceding line, only one of the plurality of color-separated regions is integrated. In some cases, even if pixels of the same color are adjacent, they are divided into a plurality of different color-separated regions, as shown in FIG. 5. On the line L8, two color-separated regions that are adjacent to color-separated region 8 and have the same pixel value are generated (the color-separated region of the pixel (0, 8) and the pixel (1, 8) and the color-separated region of the pixel (4, 8) and the pixel (5, 8)). If processing starts from the color-separated region on the left side, the color-separated region of the pixel (0, 8) and the pixel (1, 8) is processed first and integrated with color-separated region 8. As a result, the color-separated region of the pixel (4, 8) and the pixel (5, 8) is divided as different color-separated region 15 although it is a color-separated region adjacent to color-separated region 8 and having the same color.

With the above-described processing, the rectangular region 400 is divided into color-separated regions 0 to 20 shown in FIG. 6.

The boundary generation unit 202 generates boundary information formed from the coordinates and pixel values of the left-end pixels of each of color-separated regions 0 to 20 (step S303). In this embodiment, a boundary is represented as a set of the coordinates of the left-end pixels of a corresponding color-separated region. Referring to FIG. 6, a vertical bold line represents a boundary, and a horizontal bold broken line is an auxiliary line representing that the boundary continues. An open circle represents the start point of a boundary, and a full circle represents the end point of the boundary. The boundary of a color-separated region R will be referred to as a boundary R hereinafter. For example, boundary 9 starts from (2, 2) serving as the start point, continues to (3, 3), (4, 4), (5, 5), and (6, 6), and ends at (7, 7) serving as the end point.

The header generation unit 203 refers to the boundary information generated by the boundary generation unit 202, and generates, for each boundary, a boundary header including the coordinates (X, Y) of the start point of the boundary, the y-coordinate of the end point, and the pixel value of a color-separated region corresponding to the boundary (step S304).

The trajectory generation unit 204 refers to the boundary information generated by the boundary generation unit 202, and calculates, for each boundary and each line, the X-direction displacement of the boundary between two lines adjacent in the Y direction. The trajectory generation unit 204 generates line-specific trajectory information including a set of displacements obtained as the result of calculation (step S305).

FIGS. 7A-7C show the numerical data of boundaries 0 to 20 shown in FIG. 6. Each of the boundary headers of boundaries 0 to 20 includes the coordinates (start x-coordinate, head y-coordinate) of the start point of a corresponding boundary, an end y-coordinate that is the y-coordinate of the end point, and a region color that is the pixel value of a corresponding color-separated region. The boundary-specific trajectory information of boundary 0 represents a set of the displacements of the x-coordinates of boundary 0 associated with progress of the line. This also applies to boundaries 1 to 20. For example, boundary 2 exists across coordinates Y=0 to 15. For this reason, the boundary-specific trajectory information of boundary 2 is generated as the set of the following 15 displacements.

The displacement of the x-coordinate from line 0 to line 1 is +1.
The displacement of the x-coordinate from line 1 to line 2 is +1.
The displacement of the x-coordinate from line 2 to line 3 is +1.
The displacement of the x-coordinate from line 3 to line 4 is +1.
The displacement of the x-coordinate from line 4 to line 5 is +1.
The displacement of the x-coordinate from line 5 to line 6 is +1.
The displacement of the x-coordinate from line 6 to line 7 is +1.
The displacement of the x-coordinate from line 7 to line 8 is −1.
The displacement of the x-coordinate from line 8 to line 9 is −1.
The displacement of the x-coordinate from line 9 to line 10 is −1.
The displacement of the x-coordinate from line 10 to line 11 is −1.
The displacement of the x-coordinate from line 11 to line 12 is −1.
The displacement of the x-coordinate from line 12 to line 13 is −1.
The displacement of the x-coordinate from line 13 to line 14 is −1.
The displacement of the x-coordinate from line 14 to line 15 is −1.

The trajectory generation unit 204 refers to the generated boundary-specific trajectory information, and generates, for each line, line-specific trajectory information including the displacement, between the line and the next line, of each boundary existing on the line. FIGS. 8A and 8B show an example of the line-specific trajectory information. For example, "trajectory information@Y=0" is the trajectory information of the line L0, and includes the displacements, between the line L0 and the line L1, of boundaries 0 to 7 existing on the line L0. "Boundary 0(0)" represents the displacement of boundary 0 associated with progress from the line L0 to the line L1, and the displacement is +1.

When the generation of the boundary data ends, the boundary generation unit 202 outputs, to the head of encoded data, a boundary count (E) that is the total number of boundaries (step S306).

The aligning unit 205 executes the processes of steps S307 to S317 of the encoding processing, thereby aligning the boundary headers generated by the header generation unit 203 and the pieces of trajectory information generated by the trajectory generation unit 204 and generating encoded data. The aligning unit 205 compares the boundary count (E) with the number of pixels (=16) of a line in the horizontal direction (step S307). Note that in another embodiment, a predetermined number according to the number of pixels of a line, for example, a predetermined number larger than the number of pixels of a line may be compared with the boundary count. According to the result of comparison, the aligning unit 205 changes a manner in which the boundary headers and the pieces of line-specific trajectory information are aligned in accordance with the result of comparison. For example, if the boundary count (E) is 16 or less, the aligning unit 205 outputs all the boundary headers aligned in the order of the coordinates of the start points next to the boundary count (E) (step S308), and then outputs all pieces of line-specific trajectory information aligned in the order of the coordinates of the boundaries of the application target (step S309).

If the boundary count (E) is larger than 16, the aligning unit 205 first outputs 16 boundary headers in the order of the coordinates of the start points next to the boundary count (E) (step S310). Next, the aligning unit 205 outputs line-specific trajectory information for one line (in this case, concerning the line L0) in the order of the coordinates of the boundaries of the application target (step S311). Next, the aligning unit 205 determines the presence/absence of a boundary header that is not output to the encoded data yet (step S312). If a boundary header that is not output to the encoded data exists, the aligning unit 205 determines the presence/absence of a boundary that ends in the line L0 (step S313). If a boundary that ends in the line L0 exists, the aligning unit 205 compares the number (n) of boundaries that end in the line L0 with the number of boundary headers that are not output to the encoded data (step S314). If the number (n) of boundaries that end in the line L0 is smaller than the number of boundary headers that are not output to the encoded data, the aligning unit 205 selects n boundary headers from the boundary headers that are not output. The aligning unit 205 outputs the n selected boundary headers next to the line-specific trajectory information output in step S311 (step S315). If the number (n) of boundaries that end in the line L0 is equal to or larger than the number of boundary headers that are not output to the encoded data, the aligning unit 205 outputs all the boundary headers that are not output next to the line-specific trajectory information output in step S311 (step S316). The aligning unit 205 determines whether the processed line is the final line (step S317). If the processed line is the final line, the encoding ends. If the processed line is not the final line, the processes of steps S311 to S316 are repeated for the next line.

According to the above processing, if E>16, the aligning unit 205 aligns 16 boundary headers and the remaining boundary headers while inserting line-specific trajectory information corresponding to the first line L0. FIGS. 8A and 8B show an example of encoded data. By the process of step S306, a data region 802 (bit string) representing the boundary count is arranged at the head of the encoded data. By the process of step S310, a data region 804 in which 16 boundary headers are aligned in ascending order of y- and x-coordinates is arranged next to the data region 802. By the process of step S311, a data region 806 representing line-specific trajectory information (trajectory information@Y=0) concerning the first line L0 is arranged next to the data region 804. Trajectory information@Y=0 includes the amount of displacement of the x-coordinate between the line L0 and the line L1 for each of boundaries 0, 1, 2, 3, 4, 5, 6, and 7 which exist on the line L0 and do not end in the line L0.

If the line L0 is the line, step S313 results in "NO", that is, it is determined that there is no boundary that ends in the line L0. Hence, after NO determination in step S317, the process returns to step S311, and a data region 808 representing line-specific trajectory information (trajectory information@Y=1) concerning the next line L1 is arranged next to the data region 806. Trajectory information@Y=1 includes the amount of displacement of the x-coordinate between the line L1 and the line L2 for each of boundaries 8, 2, and 5 which exist on the line L1 and do not end in the line L1. For the line L1, both steps S312 and S313 result in "YES". Step S314 results in "NO" because n=6≥4(=the number of boundaries that are not output), and the process advances to step S316. By the process of step S316, a data region 810 in which the remaining four boundary headers that are not output to the encoded data yet are aligned in ascending order of y- and x-coordinates is arranged next to the data region 808.

Since step S312 always results in "NO" in the subsequent encoding processing, the process of step S311 is repetitively executed up to the final line L15. As a result, a data region 812 representing line-specific trajectory information (trajectory information@Y=2 to 14) for the lines L2 to L14 is arranged next to the data region 810. Note that the line L15 is the final line, and there is no boundary that exists across the line L15, there is no line-specific trajectory information concerning the line L15.

Trajectory information@Y=2 includes the amount of displacement of the x-coordinate between the line L2 and the line L3 for each of boundaries 8, 9, 10, 2, 11, 12, 5, and 13 which exist on the line L2 and do not end in the line L2. Trajectory information@Y=3 includes the amount of displacement of the x-coordinate between the line L3 and the line L4 for each of boundaries 8, 9, 10, 2, 11, 12, and 5 which exist on the line L3 and do not end in the line L3. Trajectory information@Y=4 includes the amount of displacement of the x-coordinate between the line L4 and the line L5 for each of boundaries 8, 9, 10, 2, 11, 12, and 5 which exist on the line L4 and do not end in the line L4. Trajectory information@Y=5 includes the amount of displacement of the x-coordinate between the line L5 and the line L6 for each of boundaries 8, 9, 10, 2, 11, and 12 which exist on the line L5 and do not end in the line L5. Trajectory information@Y=6 includes the amount of displacement of the x-coordinate between the line L6 and the line L7 for each of boundaries 8, 9, 10, 2, 11, and 12 which exist on the line L6 and do not end in the line L6. Trajectory information@Y=7 includes the amount of displacement of the x-coordinate between the line L7 and the line L8 for each of boundaries 8 and 2 which exist on the line L7 and do not end in the line L7. Trajectory information@Y=8 includes the amount of displacement of the x-coordinate between the line L8 and the line L9 for each of boundaries 8, 14, 15, 16, 17, 2, 18, and 19 which exist on the line L8 and do not end in the line L8. Trajectory information@Y=9 includes the amount of displacement of the x-coordinate between the line L9 and the line L10 for each of boundaries 14, 15, 16, 17, 2, 18, 19, and 20 which exist on the line L9 and do not end in the line L9. Trajectory information@Y=10 includes the amount of displacement of the x-coordinate between the line L10 and the line L11 for each of boundaries 14, 15, 16, 17, 2, 18, 19, and 20 which exist on the line L10 and do not end in the line L10. Trajectory information@Y=11 includes the amount of displacement of the x-coordinate between the line L11 and the line L12 for each of boundaries 15, 16, 17, 2, 18, 19, and 20 which exist on the line L11 and do not end in the line L11. Trajectory information@Y=12 includes the amount of displacement of the x-coordinate between the line L12 and the line L13 for each of boundaries 15, 16, 17, 2, 18, 19, and 20 which exist on the line L12 and do not end in the line L12. Trajectory information@Y=13 includes the amount of displacement of the x-coordinate between the line L13 and the line L14 for each of boundaries 16, 17, 2, 18, 19, and 20 which exist on the line L13 and do not end in the line L13. Trajectory information@Y=14 includes the amount of displacement of the x-coordinate between the line L14 and the line L15 for each of boundaries 16, 17, 2, 18, 19, and 20 which exist on the line L14 and do not end in the line L14.

As described above, if the number of boundary data exceeds the predetermined number (=16) in the encoded data, output of some boundary headers is put on hold. Encoded data generated by an encoding means such as an external host computer is received by the external IF 104, transferred to the RAM 102, and stored under the control of the CPU 101.

Figure 9:
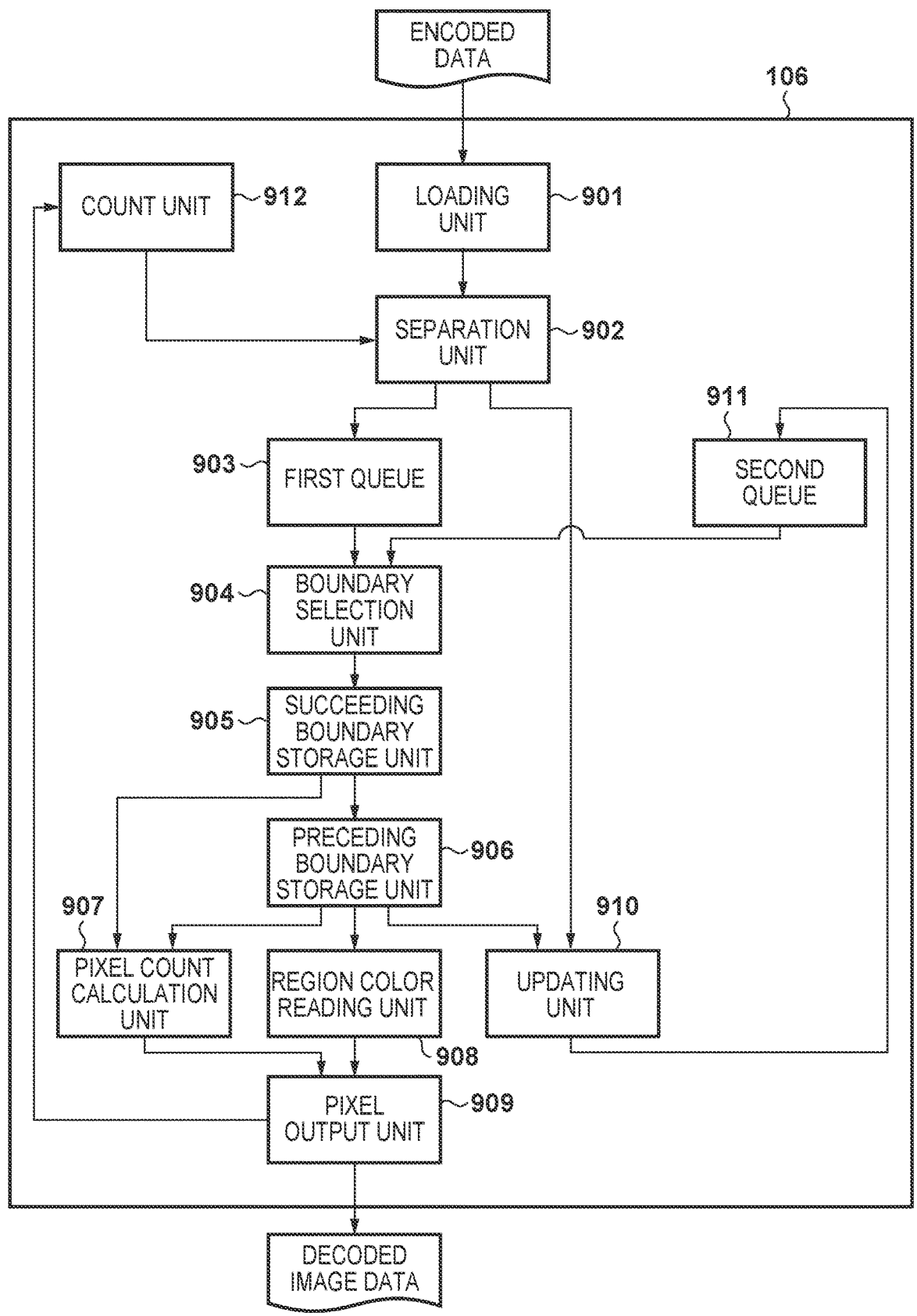
FIG. 9 is a block diagram showing the functions and arrangement of a decoding device shown in FIG. 1.

FIG. 9 is a block diagram showing the functions and arrangement of the decoding device 106 shown in FIG. 1. The decoding device 106 includes a loading unit 901, a separation unit 902, a first queue 903, a boundary selection unit 904, a succeeding boundary storage unit 905, a preceding boundary storage unit 906, a pixel count calculation unit 907, a region color reading unit 908, a pixel output unit 909, an updating unit 910, a second queue 911, and a count unit 912. The loading unit 901 loads encoded data sequentially from the head. The separation unit 902 separates the encoded data loaded by the loading unit 901 into boundary headers and line-specific trajectory information. The first queue 903 is a FIFO that stores a boundary header obtained by the separation processing of the separation unit 902 as a new boundary header. Write to the first queue 903 and readout from the first queue 903 are done on a boundary header basis. The first queue 903 can be configured to refer to the boundary header stored at the head of the first queue 903 without deleting it from the first queue 903. The first queue 903 is configured to hold 16 boundary headers at maximum.

The boundary selection unit 904 compares the information of a continued boundary stored in the second queue 911 with a new boundary header stored in the first queue 903. More specifically, the boundary selection unit 904 selects a boundary with smaller coordinates (X, Y) (a smaller y-coordinate, or a smaller x-coordinate if the y-coordinate values are the same) as a succeeding boundary. A detailed selection method will be described later with reference to FIGS. 12A and 12B.

The succeeding boundary storage unit 905 stores the succeeding boundary selected by the boundary selection unit 904. If the boundary selection unit 904 selects a new succeeding boundary, the preceding boundary storage unit 906 stores, as a preceding boundary, a succeeding boundary already stored in the succeeding boundary storage unit 905. The pixel count calculation unit 907 calculates the difference between the x-coordinate of the succeeding boundary and the x-coordinate of the preceding boundary, and obtains the calculation result as an output pixel count. The region color reading unit 908 reads the pixel value of the preceding boundary stored in the preceding boundary storage unit 906. The pixel output unit 909 obtains a pixel value read by the region color reading unit 908 as an output pixel value, and outputs the output pixel values continuously as many as the output pixel count obtained as the result of calculation by the pixel count calculation unit 907.

The updating unit 910 reads the y-coordinate of the end point of the preceding boundary. If the read y-coordinate is larger than the y-coordinate of a line under the processing, the updating unit 910 updates the coordinates (X, Y) of the boundary by the line-specific trajectory information of the line under the processing, which is obtained by the separation processing of the separation unit 902. The second queue 911 is a FIFO that stores the information of the boundary whose coordinates (X, Y) are updated by the updating unit 910 as the information of a continued boundary (to be referred to as continued boundary information hereinafter). Write to the second queue 911 and readout from the second queue 911 are done on a continued boundary information basis. The second queue 911 can be configured to refer to the continued boundary information stored at the head of the second queue 911 without deleting it from the second queue 911. The second queue 911 is configured to hold 16 boundary headers at maximum.

The continued boundary information includes the updated coordinates (X, Y) of the boundary, the y-coordinate of the end point, and the pixel value of the corresponding color-separated region. For example, in the example shown in FIG. 6, if the boundary header of boundary 0 is updated in the decoding processing of the line L0, the coordinates change to the coordinates (1, 1) on the line L1. The coordinates are stored in the second queue 911 as continued boundary information together with the y-coordinate (1) of the end point and the pixel value (0xAAAAAA) of the color-separated region. The count unit 912 counts the number of decoded lines (to be referred to as a decoded line count hereinafter) by counting up every time the pixel output unit 909 outputs 16 pixels corresponding to the number of pixels of the rectangular region in the horizontal direction.

Each of the loading unit 901, the separation unit 902, the first queue 903, the boundary selection unit 904, the succeeding boundary storage unit 905, the preceding boundary storage unit 906, the pixel count calculation unit 907, the region color reading unit 908, the pixel output unit 909, the updating unit 910, the second queue 911, and the count unit 912 may be implemented by software executed by a general-purpose processor and a processor. Alternatively, each unit may be implemented by dedicated hardware. Hence, the decoding device 106 may be implemented by software executed by a general-purpose processor and a processor, or may be implemented by dedicated hardware. Alternatively, the decoding device 106 may be implemented by combining a general-purpose processor and dedicated hardware.

Figure 10:
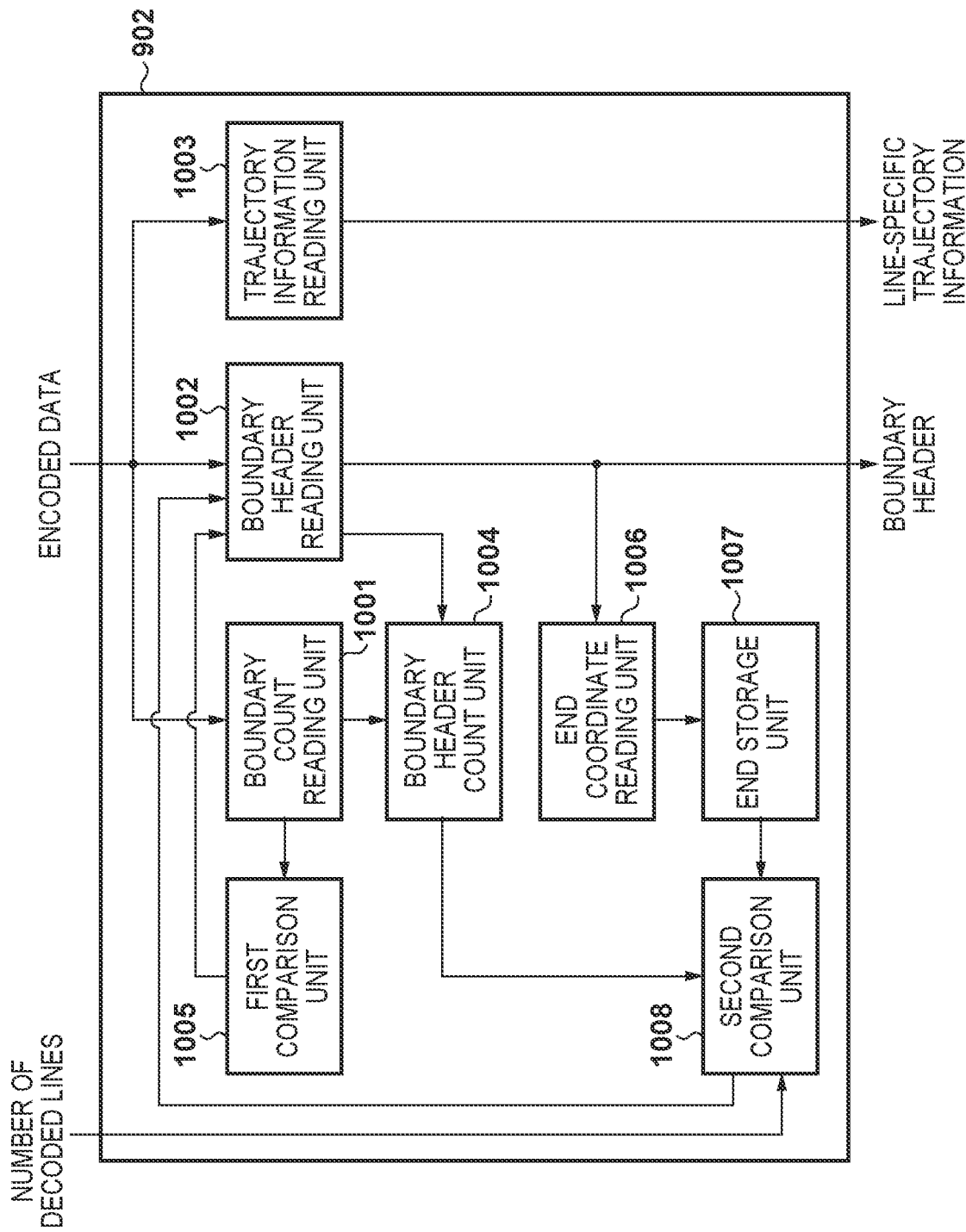
FIG. 10 is a block diagram showing a hardware arrangement in a case in which a separation unit shown in FIG. 9 is implemented by hardware.

FIG. 10 is a block diagram showing a hardware arrangement in a case in which the separation unit 902 shown in FIG. 9 is implemented by hardware. The separation unit 902 includes a boundary count reading unit 1001, a boundary header reading unit 1002, a trajectory information reading unit 1003, a boundary header count unit 1004, a first comparison unit 1005, an end coordinate reading unit 1006, an end storage unit 1007, and a second comparison unit 1008. The boundary count reading unit 1001 refers to the head of encoded data and reads the boundary count. The boundary header reading unit 1002 reads a boundary header from encoded data in accordance with the comparison result of the first comparison unit 1005 and the comparison result of the second comparison unit 1008. The trajectory information reading unit 1003 reads line-specific trajectory information from encoded data in response to a request from the updating unit 910.

The boundary header count unit 1004 sets the boundary count read by the boundary count reading unit 1001 as the initial value of the count value, and decrements the count value every time the boundary header reading unit 1002 reads a boundary header later. With this operation, the number of boundary headers that are not yet read out from the encoded data is counted. That is, the count value of the boundary header count unit 1004 represents the number of boundary headers that are not yet read out from the encoded data.

The first comparison unit 1005 compares the boundary count read by the boundary count reading unit 1001 with 16 that is the number of pixels of the rectangular region in the horizontal direction, and outputs the comparison result to the boundary header reading unit 1002. More specifically, the first comparison unit 1005 determines whether the boundary count is 16 or less, and outputs the determination result to the boundary header reading unit 1002. The end coordinate reading unit 1006 reads the end y-coordinate of each boundary header. The end storage unit 1007 counts, for each line of the rectangular region, the number of boundaries that end in the line, and stores the number of boundaries. When the decoded line count is updated by the count unit 912, the second comparison unit 1008 compares the number of boundary headers that are not yet read out with the number of boundaries that end in the immediately preceding line, and outputs the comparison result to the boundary header reading unit 1002.

Each of the boundary count reading unit 1001, the boundary header reading unit 1002, the trajectory information reading unit 1003, the boundary header count unit 1004, the first comparison unit 1005, the end coordinate reading unit 1006, the end storage unit 1007, and the second comparison unit 1008 may be implemented by software executed by a general-purpose processor and a processor. Alternatively, each unit may be implemented by dedicated hardware. Hence, the separation unit 902 may be implemented by software executed by a general-purpose processor and a processor, or may be implemented by dedicated hardware. Alternatively, the separation unit 902 may be implemented by combining a general-purpose processor and dedicated hardware.

Figure 11:
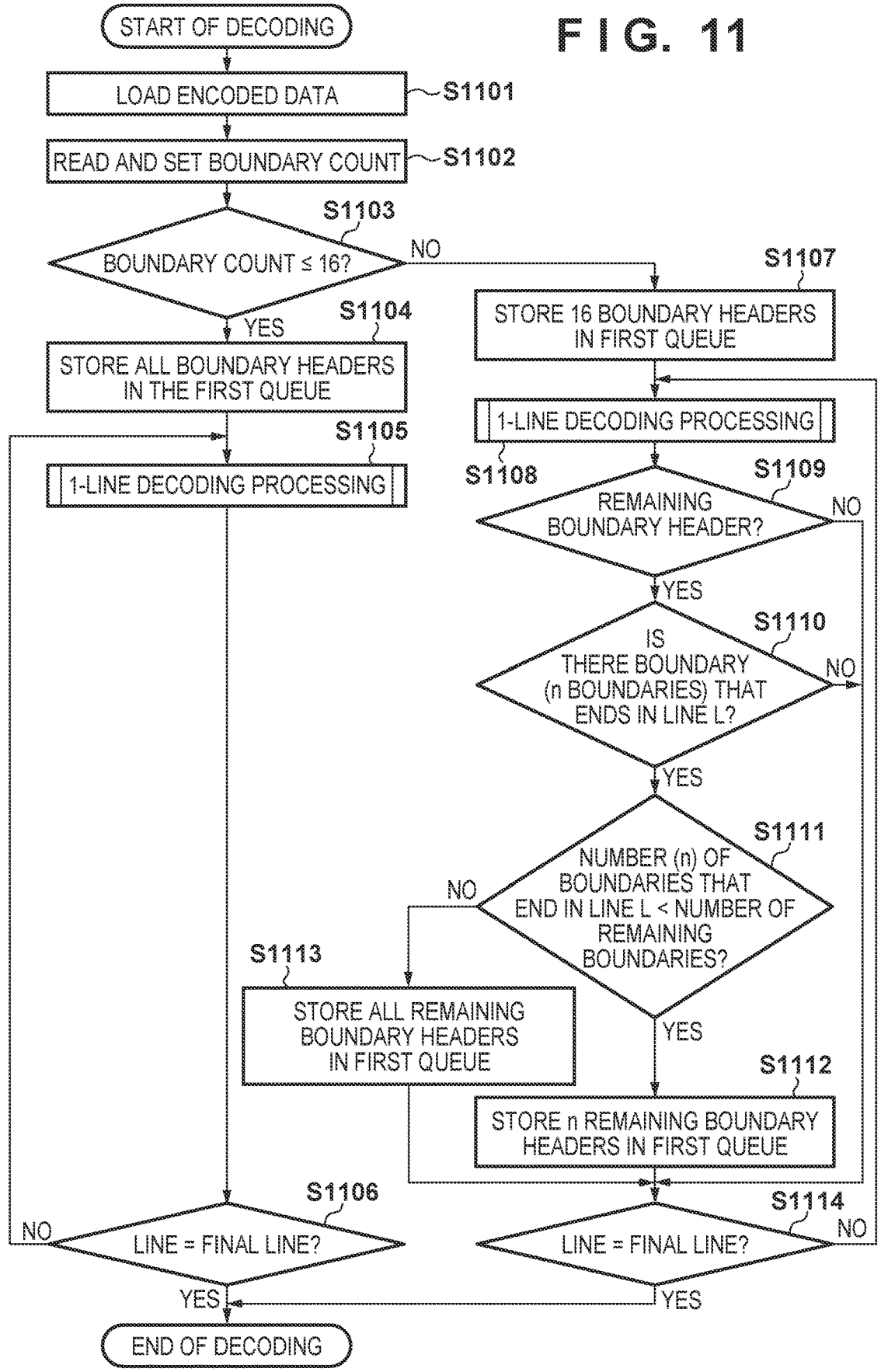
FIG. 11 is a flowchart showing the procedure of decoding processing of the decoding device shown in FIG. 9.
Figure 12A:
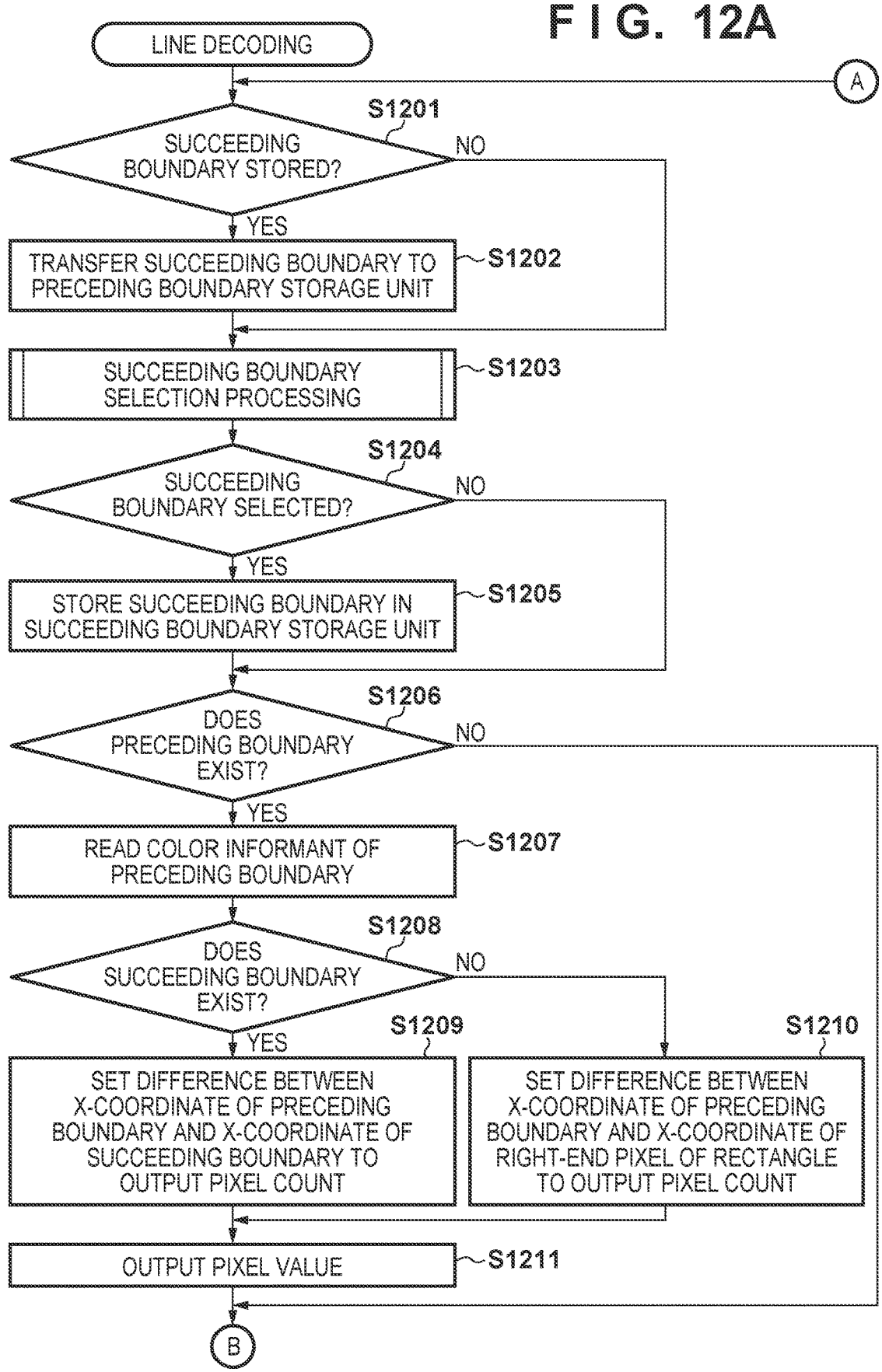
FIGS. 12A and 12B are flowcharts showing the procedure of line decoding processing in the decoding processing shown in FIG. 11.
Figure 12B:
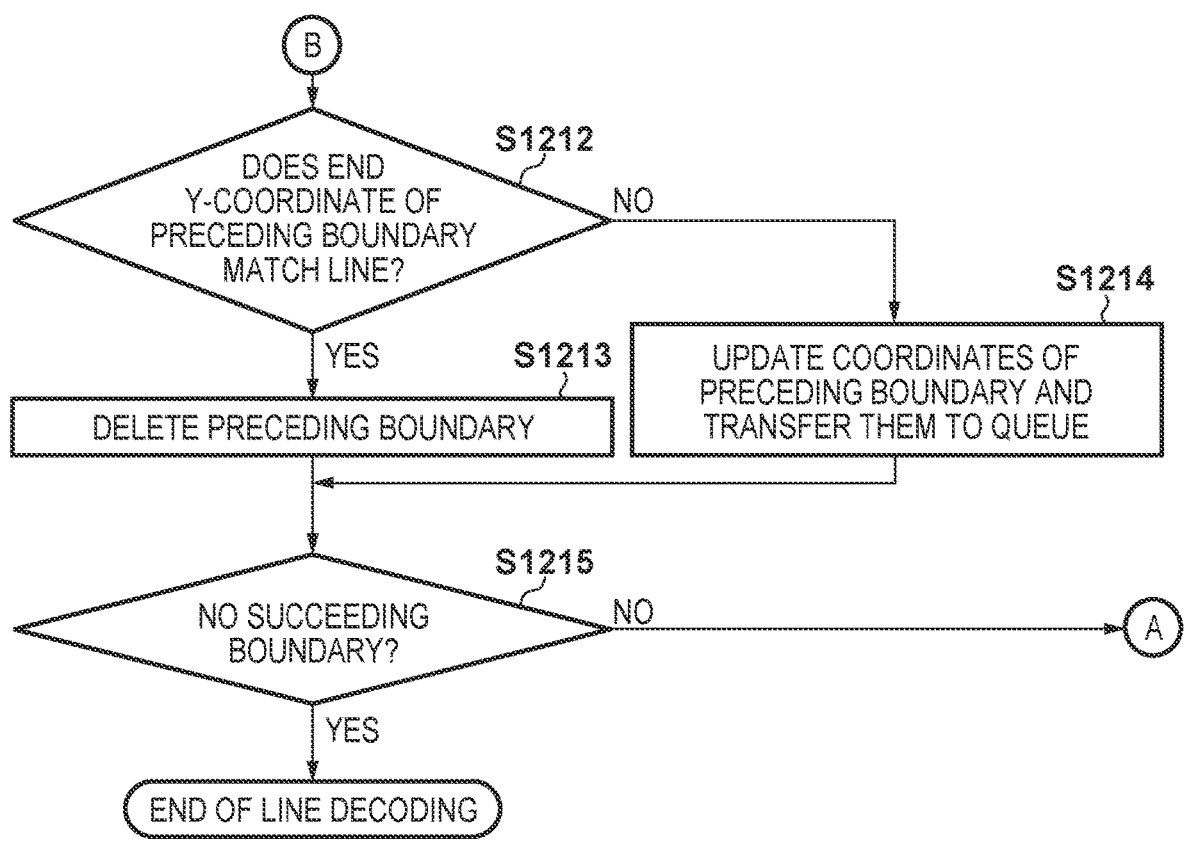
Figure 13:
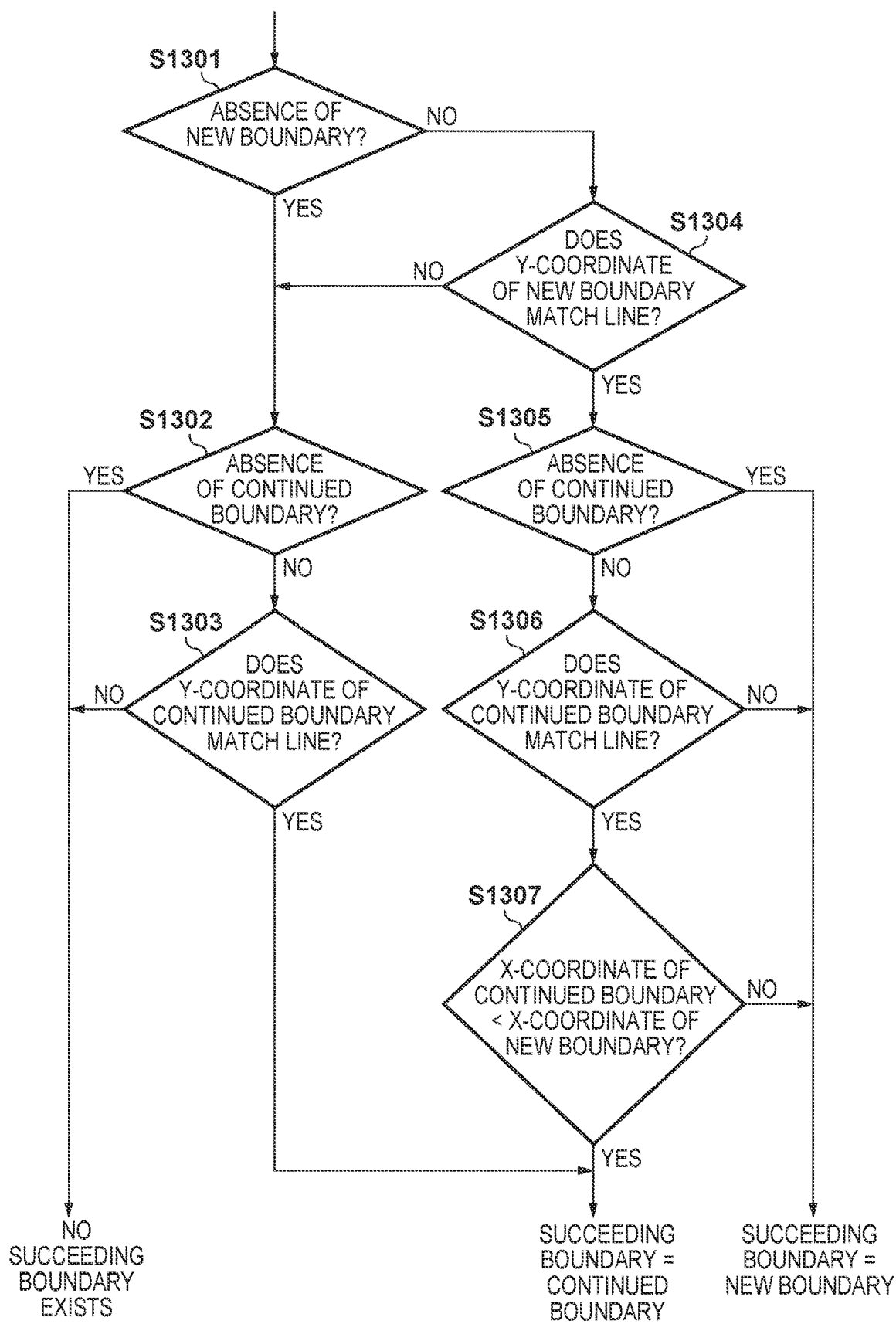
FIG. 13 is a flowchart showing the procedure of succeeding boundary selection processing in the decoding processing shown in FIG. 11.

Decoding processing of the decoding device 106 shown in FIG. 9 will be described below with reference to FIGS. 8A, 8B and 11 to 13. FIG. 11 is a flowchart showing the procedure of decoding processing of the decoding device 106 shown in FIG. 9. FIGS. 12A and 12B are flowcharts showing the procedure of 1-line decoding processing in the decoding processing shown in FIG. 11. FIG. 13 is a flowchart showing the procedure of succeeding boundary selection processing in the decoding processing shown in FIG. 11.

The decoding device 106 loads, by the loading unit 901, encoded data (see FIGS. 8A and 8B) transferred from the RAM 102 by the DMAC 105 (step S1101). The boundary count reading unit 1001 reads the boundary count (E) from the head of the loaded encoded data, and stores the boundary count (E) (step S1102). The first comparison unit 1005 determines whether the read boundary count (E) is not more than 16 that is the number of pixels of one line (step S1103). If the boundary count (E) is 16 or less, the boundary header reading unit 1002 reads out all boundary headers from the encoded data and stores them in the first queue 903 (step S1104). In this case, the trajectory information reading unit 1003 transfers all the remaining portions of the encoded data to the updating unit 910 as line-specific trajectory information. The decoding device 106 performs 1-line decoding processing to be described later (step S1105). If the boundary count (E) is 16 or less, the decoding device 106 determines whether the line that has undergone the 1-line decoding processing is the final line (L15) (step S1106). If the line is not the final line, the decoding device 106 performs decoding processing of the next line. If the line is the final line, the decoding device 106 ends the decoding processing. As described above, in step S1103, it is decided, based on the magnitude relationship between the boundary count and the predetermined number (=16), whether to store all the boundary headers in the first queue 903 all at once.

If it is determined in step S1103 that the boundary count (E) is 17 or more, the separation unit 902 reads out 16 boundary headers from the encoded data, and stores them in the first queue 903 (step S1107). Since the encoded data shown in FIGS. 8A and 8B includes 21 boundaries, 16 boundary headers out of them are loaded into the first queue 903 in step S1107. The decoding device 106 performs 1-line decoding processing to be described later (step S1108). If the 1-line decoding processing ends, the decoding device 106 determines whether a boundary header (to be referred to as a remaining boundary header hereinafter) that is not yet loaded into the first queue 903 exists (step S1109). In the encoded data shown in FIGS. 8A and 8B, since 16 boundary headers are first loaded into the first queue 903, five remaining boundary headers exist. If it is determined in step S1109 that a remaining boundary header exists, the decoding device 106 determines whether there is a boundary that ends in the line L of the decoding target (step S1110). In the encoded data shown in FIGS. 8A and 8B, a boundary that ends in the first line (L0) does not exist. For this reason, the decoding device 106 determines whether the line L0 is the final line (step S1114), and then performs processing of the next line L1. The same processing as described above is performed for the lines L2, L3, L4, L5, L6, L8, L10, L12, and L14 as well.

If it is determined in step S1110 that there is a boundary that ends in the line L of the decoding target, the second comparison unit 1008 compares the number (n) of boundaries that end in the line L with the number of remaining boundary headers (step S1111). Since six boundaries, that is, boundary 0, boundary 1, boundary 3, boundary 4, boundary 6, and boundary 7 end in the line L1, it is determined in step S1111 whether the number of boundaries (=6) that end is smaller than the number of remaining boundaries (=5). If it is determined in step S1111 that the number (n) of boundaries that end in the line L is smaller than the number of remaining boundary headers, the boundary header reading unit 1002 selects n remaining boundary headers and stores them in the first queue 903 (step S1112). On the other hand, if the number (n) of boundaries that end in the line L is equal to or larger than the number of remaining boundary headers, the boundary header reading unit 1002 stores all the remaining boundary headers in the first queue 903 (step S1113). In the encoded data shown in FIGS. 8A and 8B, since the number of boundaries (=6) that end in the line L1 is not smaller than the number of remaining boundary headers (=5), all the five remaining boundary headers are stored in the first queue 903. If the number of remaining boundaries is larger than 6, six remaining boundary headers are selected and stored in the first queue 903 in the process of step S1112. The lines L3, L5, L7, L9, L11, and L13 include boundaries ending there. However, since all boundary headers are already loaded, in step S1109, it is determined that there is no remaining boundary header, and no boundary header is stored in the first queue 903. The decoding device 106 determines whether the line that has undergone the 1-line decoding processing is the final line (L15) (step S1114). If it is determined in step S1114 that the line is not the final line (L15), the process returns to step S1108 to perform processing of the next line. If the line is the final line, the decoding processing ends.

The 1-line decoding processing (step S1105 or S1108) shown in FIG. 11 is performed in accordance with the procedure shown in FIGS. 12A and 12B. First, the decoding device 106 determines whether the succeeding boundary of the line L of the decoding target is stored in the succeeding boundary storage unit 905 (step S1201). If the succeeding boundary of the line L is stored in the succeeding boundary storage unit 905, the decoding device 106 transfers the succeeding boundary to the preceding boundary storage unit 906 (step S1202). No succeeding boundary is stored in the succeeding boundary storage unit 905 at the start of processing of a given line. The boundary selection unit 904 selects a succeeding boundary by referring to the first queue 903 and the second queue 911 in accordance with succeeding boundary selection processing to be described later (step S1203). The decoding device 106 determines whether a succeeding boundary is selected or no boundary is selected from any queue in the succeeding boundary selection processing (step S1204). If a succeeding boundary is selected, the boundary selection unit 904 transfers the succeeding boundary from the selected queue of the first queue 903 and the second queue 911 to the succeeding boundary storage unit 905 and stores it in the succeeding boundary storage unit 905 (step S1205).

Next, the decoding device 106 determines whether a preceding boundary is stored in the preceding boundary storage unit 906 (step S1206). If a succeeding boundary is selected in a certain line for the first time, no preceding boundary is stored in the preceding boundary storage unit 906. If the second or subsequent succeeding boundary is selected in a certain line, a preceding boundary is stored in the preceding boundary storage unit 906. If a preceding boundary is stored in the preceding boundary storage unit 906, the region color reading unit 908 reads a region color from the preceding boundary (step S1207). Next, the pixel count calculation unit 907 confirms whether a succeeding boundary is stored in the succeeding boundary storage unit 905 (step S1208). If a succeeding boundary is stored, the pixel count calculation unit 907 sets the difference between the x-coordinate of the preceding boundary and the x-coordinate of the succeeding boundary to the output pixel count (step S1209). The output pixel count is set in step S1209 except for the rightmost color-separated region on the line. If no succeeding boundary is stored in the succeeding boundary storage unit 905, the pixel count calculation unit 907 sets the difference between the x-coordinate of the preceding boundary and the coordinate (=16) of the right end of the rectangular region to the output pixel count (step S1210). In the rightmost color-separated region on the line, the output pixel count is set in step S1210. The pixel output unit 909 outputs the region color read in step S1207 continuously as many as the output pixel count set in step S1209 or S1210 (step S1211). The updating unit 910 determines whether the end y-coordinate of the preceding boundary matches the line (L) (step S1212). If the coordinate matches the line (Y=L), the updating unit 910 deletes the preceding boundary (step S1213). If the coordinate has another value (Y>L), the updating unit 910 reads out line-specific trajectory information from the separation unit 902, updates the coordinate information of the preceding boundary, transfers the coordinate information to the second queue 911, and stores it (step S1214). At this time, the decoding device 106 determines whether a succeeding boundary is stored in the succeeding boundary storage unit 905 (step S1215). If no succeeding boundary is stored, the decoding device 106 determines that the processing of the rightmost color-separated region on the line ends, and ends the 1-line decoding processing. If a succeeding boundary is stored in the succeeding boundary storage unit 905, the process returns to step S1201 to perform processing of the next color-separated region.

The succeeding boundary selection processing (step S1203) shown in FIGS. 12A and 12B is performed in accordance with the procedure shown in FIG. 13. First, the decoding device 106 determines whether a new boundary header is stored in the first queue 903 (step S1301). If no new boundary header is stored in the first queue 903, the decoding device 106 determines whether continued boundary information is stored in the second queue 911 (step S1302). If no continued boundary information exists in the second queue 911, the decoding device 106 determines that "no succeeding boundary exists". If continued boundary information exists in the second queue 911 in step S1302, the decoding device 106 determines whether the y-coordinate of the continued boundary information at the head of the second queue 911 matches the line L (step S1303). If the y-coordinate is different from the line L, the decoding device 106 determines that "no succeeding boundary exists". If the y-coordinate matches the line L, the decoding device 106 selects the "continued boundary" as a succeeding boundary. If it is determined in step S1301 that a new boundary header exists, the decoding device 106 determines whether the start y-coordinate of the new boundary header at the head of the first queue 903 matches the line L (step S1304). If the start y-coordinate does not match the line L, the decoding device 106 performs the determination of step S1302. If the start y-coordinate matches the line L, the decoding device 106 determines whether continued boundary information is stored in the second queue 911 (step S1305). If continued boundary information exists in the second queue 911, the decoding device 106 determines whether the y-coordinate of the continued boundary information at the head of the second queue 911 matches the line L (step S1306). If the y-coordinate does not match the line L, the decoding device 106 selects the "new boundary" as a succeeding boundary. If it is determined in step S1306 that the y-coordinate of the continued boundary matches the line L, the decoding device 106 compares the x-coordinate of the continued boundary with the start x-coordinate of the new boundary header (step S1307). If it is determined in step S1306 that the y-coordinate of the continued boundary does not match the line L, the decoding device 106 selects the "new boundary" as a succeeding boundary. If the x-coordinate of the continued boundary is smaller than the start x-coordinate of the new boundary header in step S1307, the decoding device 106 selects the "continued boundary" as a succeeding boundary. Otherwise, the decoding device 106 selects the "new boundary" as a succeeding boundary. Note that if it is determined that "no succeeding boundary exists", the succeeding boundary storage unit 905 is empty in the 1-line decoding processing.

According to the encoding/decoding method of this embodiment, since a buffer memory capable of storing headers as many as the number of pixels of the encoding unit in the horizontal direction, and a simple loading means for loading encoded data sequentially from the head are provided, the scale of hardware of the decoding device can be reduced. In addition, since the encoded data can be read by accessing the DRAM in the order of address, the efficiency of memory transfer improves.

In the encoding/decoding method according to this embodiment, when decoding a line of a rectangular region, it is guaranteed that a boundary header necessary for the decoding of the line is stored in the queue. On the other hand, an unnecessary boundary header is not read out. Hence, the size of the queue can be reduced. As a result, it is possible to reduce the scale of hardware of the encoding device that generates encoded data including the boundary of a color-separated region and the pixel value of the color-separated region. It is also possible to reduce the scale of hardware of the decoding device that decodes the encoded data and generates an image. In addition, the efficiency of memory transfer when reading out encoded data can be raised.

The arrangement and operation of the image processing system 100 according to the embodiment have been described above. This embodiment is merely an example, those who are skilled in the art can understand that various modifications can be made as for the combination of the constituent elements or processes, and the modifications are also incorporated in the present invention.

An encoding device, encoded data, and a decoding device in a case in which a lossily encoded region including a plurality of pixels of different colors and a region formed from pixels of a single color coexist will be described below.

Figure 14:
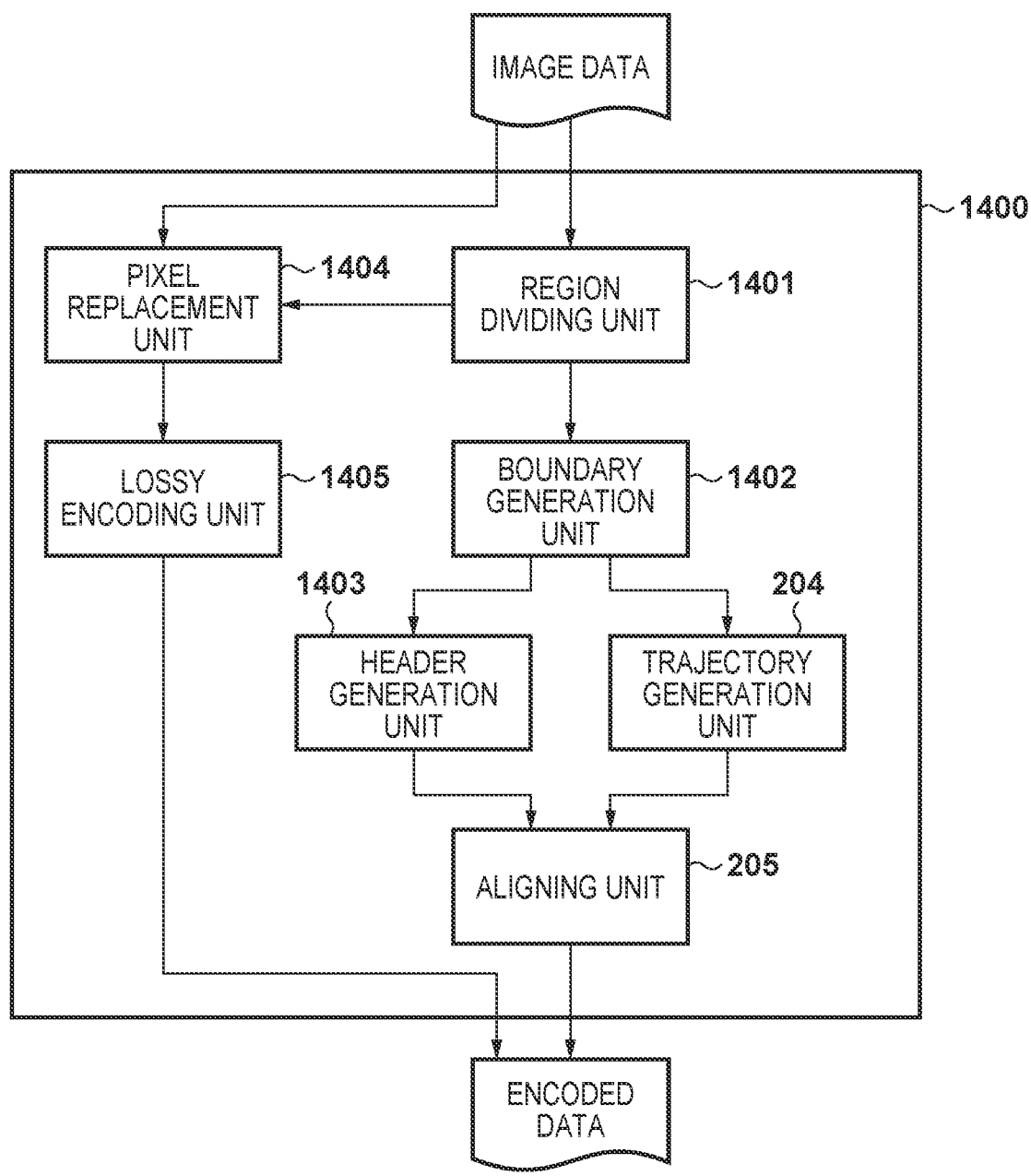
FIG. 14 is a block diagram showing the functions and arrangement of an encoding device.

FIG. 14 is a block diagram showing the functions and arrangement of an encoding device 1400. The encoding device 1400 acquires image data representing an image, and encodes the acquired image data to generate encoded data. The encoding device 1400 encodes the image data for each predetermined encoding unit. For the sake of simplicity of explanation, a case in which image data of 16×16 pixels is employed as the encoding unit, and the encoding unit is encoded and decoded will be described as an example. However, this example is not limited to 16×16 pixels. The encoding device 1400 includes a region dividing unit 1401, a boundary generation unit 1402, a header generation unit 1403, a pixel replacement unit 1404, a lossy encoding unit 1405, the trajectory generation unit 204, and the aligning unit 205.

The region dividing unit 1401 divides a rectangular region of 16×16 pixels input to the encoding device 1400 into a plurality of color-separated regions by the pixel color. If regions each formed from pixels in a number smaller than a predetermined number are adjacent in a number larger than a predetermined number, the adjacent regions are combined into a lossily encoded region. For example, if four or more regions each smaller than two pixels are adjacent, the adjacent regions are combined into one lossily encoded region. However, the method of deciding a region formed from pixels of a single color and a lossily encoded region is merely an example, and is not limited to the above-described method. The region dividing unit 1401 generates, for each region obtained by the division and combination, an attribute representing whether the region is a lossily encoded region or a region having a single pixel value.

The boundary generation unit 1402 generates boundary information representing a boundary that partitions the color-separated regions obtained as the result of division by the region dividing unit 1401 along a direction which crosses a line. For example, the boundary generation unit 1402 generates boundary information from a set of the coordinates of pixels at the left ends of the color-separated regions and the pixel values (colors) of the color-separated regions.

The header generation unit 1403 generates, for each boundary, a boundary header used to identify the boundary. Each boundary header includes the coordinates of the two ends of a corresponding boundary, the attribute of a corresponding region, and the pixel value of the corresponding region. For example, the header generation unit 1403 generates a boundary header from the x- and y-coordinates of the start point of boundary information generated by the boundary generation unit 1402, the y-coordinate of the end point, the attribute of a color-separated region corresponding to the boundary represented by the boundary information, and the pixel value of the color-separated region corresponding to the boundary represented by the boundary information. The coordinates of the boundary included in the boundary information represent the position of the boundary.

A pixel replacement unit 1404 replaces, of the pixels of the rectangular region of 16×16 pixels input to the encoding device 1400, the pixel value of pixels included in a region of a single color. For example, the pixel replacement unit 1404 selects a pixel value with which the data amount of lossily encoded data obtained by lossily encoding the image of the rectangular region of 16×16 pixels becomes smaller, and replaces the original pixel value with the selected pixel value. The lossy encoding unit 1405 performs lossy encoding such as JPEG for the image of the rectangular region of 16×16 pixels with the replaced pixel values, thereby generating lossily encoded data.

FIGS. 15A-15D are views showing the numerical data of boundaries 0 to 20 in a case in which each region without hatching in the rectangular region 400 shown in FIG. 4 is regarded as a region formed by combining regions of different pixel values. Each of the boundary headers of boundaries 0 to 20 includes the attribute of a corresponding boundary, the coordinates (start x-coordinate, head y-coordinate) of the start point, an end y-coordinate that is the y-coordinate of the end point, and a region color that is the pixel value of a corresponding color-separated region. The attribute represents whether the region corresponding to the boundary is a region of a single pixel value or a lossily encoded region formed by combining regions of different pixel values. The pieces of boundary-specific trajectory information of boundaries 0 to 20 represent sets of the displacements of the x-coordinates of boundaries 0 to 20 associated with progress of the line.

Figure 16:
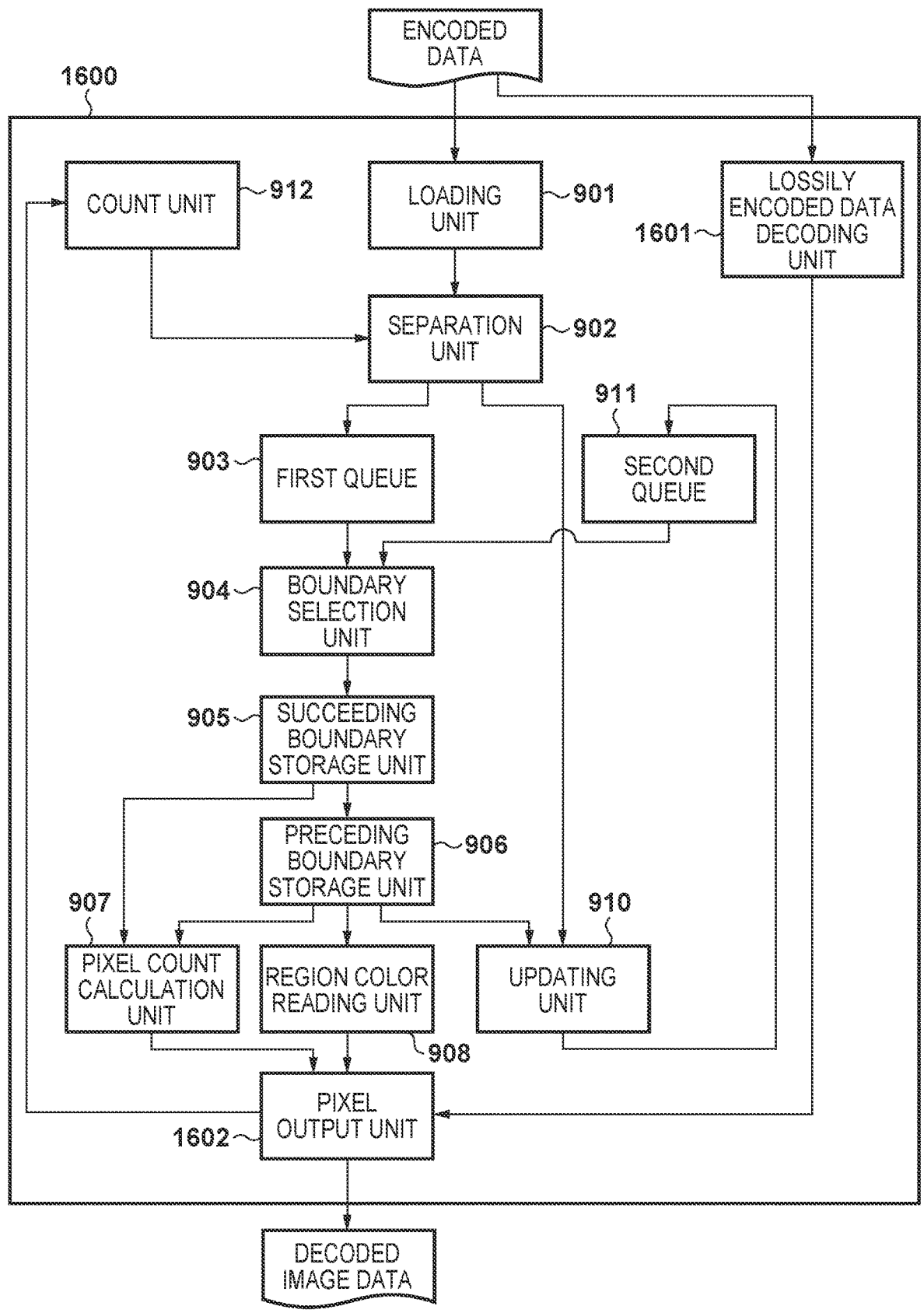
FIG. 16 is a block diagram showing the functions and arrangement of a decoding device that decodes encoded data shown in FIGS. 15A-15D.

FIG. 16 is a block diagram showing the functions and arrangement of a decoding device 1600 that decodes the encoded data shown in FIGS. 15A-15D. The decoding device 1600 includes the loading unit 901, the separation unit 902, the first queue 903, the boundary selection unit 904, the succeeding boundary storage unit 905, the preceding boundary storage unit 906, the pixel count calculation unit 907, the region color reading unit 908, the updating unit 910, a pixel output unit 1602, the second queue 911, a lossily encoded data decoding unit 1601, and the count unit 912.

The lossily encoded data decoding unit 1601 decodes lossily encoded data included in the input encoded data into image data of 16×16 pixels for each processing unit. The lossily encoded data decoding unit 1601 also rearranges the 16×16 pixels and outputs them to the pixel output unit 1602 for each line including 16×1 pixels. The pixel output unit 1602 outputs a pixel value read by the region color reading unit 908 or a pixel decoded by the lossily encoded data decoding unit 1601 in accordance with the attribute of the boundary. If the attribute of the boundary represents a region of a single color, the pixel output unit 1602 sets the pixel value read by the region color reading unit 908 to the output pixel value, and outputs the output pixel values continuously as many as the output pixel count obtained as the result of calculation by the pixel count calculation unit 907. In addition, the pixel output unit 1602 discards, of the pixels input from the lossily encoded data decoding unit 1601, pixels at the same (X, Y) coordinates as the output pixels. If the attribute of the boundary represents a lossily encoded region, the pixel output unit 1602 outputs pixels input from the lossily encoded data decoding unit 1601 continuously as many as the output pixel count obtained as the result of calculation by the pixel count calculation unit 907.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-240567, filed Dec. 12, 2016, which is hereby incorporated by reference herein in its entirety.

What is claimed is:

1. An encoding device comprising:
   a dividing unit configured to divide an encoding unit of an image into a plurality of regions;
   a header generation unit configured to generate, for each boundary that partitions each of the plurality of regions along a direction which crosses a line, a boundary header used to identify the boundary;
   a trajectory generation unit configured to generate a piece of trajectory information representing a displacement of the boundary associated with progress of the line; and
   an aligning unit configured to, when generating encoded data including the generated boundary headers and the generated pieces of trajectory information, change, in accordance with the number of boundaries, a manner in which the generated boundary headers and the generated pieces of trajectory information are aligned.

2. The device according to claim 1, wherein the aligning unit changes the manner in which the generated boundary headers and the generated pieces of trajectory information are aligned in accordance with a result of comparison between the number of boundaries and a predetermined number according to the number of pixels of a line in a direction along which the line extends.

3. The device according to claim 2, wherein the trajectory generation unit generates, for each line, the trajectory information including the displacement, between the line and a next line, of the boundary existing on the line, and
if the number of boundaries is larger than the predetermined number, the aligning unit aligns the predetermined number of boundary headers and the remaining boundary headers while inserting the trajectory information corresponding to a first line.

4. The device according to claim 3, wherein for a certain line, if the number of boundaries that end in the line is smaller than the number of boundary headers that are not yet aligned, the aligning unit selects, from the boundary headers that are not yet aligned, the boundary headers as many as the number of boundaries that end in the line, and aligns the boundary headers next to the trajectory information corresponding to the line, and if the number of boundaries that end in the line is not less than the number of boundary headers that are not yet aligned, the aligning unit aligns, next to the trajectory information corresponding to the line, all the boundary headers that are not yet aligned.

5. The device according to claim 2, wherein if the number of boundaries is not more than the predetermined number, the aligning unit aligns the trajectory information next to all the generated boundary headers.

6. The device according to claim 1, wherein each of the plurality of regions includes a region formed from adjacent pixels of different colors and a region formed from adjacent pixels of the same color.

7. The device according to claim 1, wherein each of the plurality of regions is formed from adjacent pixels of the same color.

8. The device according to claim 1, wherein the boundary is represented by a set of pixels at ends of a corresponding region.

9. The device according to claim 1, wherein the boundary header includes coordinates of two ends of a corresponding boundary and an attribute of a corresponding region.

10. The device according to claim 1, wherein the boundary header includes coordinates of two ends of a corresponding boundary and a pixel value of a corresponding region.

11. An encoding method comprising:
dividing an encoding unit of an image into a plurality of regions;
generating, for each boundary that partitions each of the plurality of regions along a direction which crosses a line, a boundary header used to identify the boundary;
generating a piece of trajectory information representing a displacement of the boundary associated with progress of the line; and
when generating encoded data including the generated boundary headers and the generated pieces of trajectory information, changing, in accordance with the number of boundaries, a manner in which the generated boundary headers and the generated pieces of trajectory information are aligned.

12. A non-transitory computer-readable storage medium storing a computer program for causing a computer to execute a method, the method comprising:
dividing an encoding unit of an image into a plurality of regions;
generating, for each boundary that partitions each of the plurality of regions along a direction which crosses a line, a boundary header used to identify the boundary;
generating a piece of trajectory information representing a displacement of the boundary associated with progress of the line; and
when generating encoded data including the generated boundary headers and the generated pieces of trajectory information, changing, in accordance with the number of boundaries, a manner in which the boundary headers and the pieces of trajectory information are aligned.

13. A decoding device configured to decode encoded data including a boundary header used to identify a boundary that partitions each of a plurality of regions obtained by dividing an encoding unit of an image along a direction which crosses a line, and a piece of trajectory information representing a displacement of the boundary associated with progress of the line and output the image, comprising:
a separation unit configured to separate the encoded data into the boundary headers and the pieces of trajectory information;
a decision unit configured to decide, in accordance with the number of boundaries, whether to store all the boundary headers in a holding unit all at once; and
a decoding unit configured to decode, for each line, the line based on the boundary header held by the holding unit.

14. The device according to claim 13, further comprising a first updating unit configured to update a position of the boundary identified by the boundary header, based on the trajectory information,
wherein the decoding unit decodes the line based on the boundary header held by the holding unit and the updated position of the boundary.

15. The device according to claim 13, wherein if the number of boundaries is larger than a predetermined number according to the number of pixels of the line in a direction along which the line extends, the decision unit decides to store the predetermined number of boundary headers in the holding unit all at once for a first line.

16. The device according to claim 15, wherein the holding unit is configured to hold the predetermined number of boundary headers at maximum.

17. The device according to claim 15, further comprising a determination unit configured to determine presence/absence of the boundary that ends in a certain line; and
a second updating unit configured to update the holding unit if it is determined that the boundary that ends in the certain line exists.

18. A decoding method of decoding encoded data including a boundary header used to identify a boundary that partitions each of a plurality of regions obtained by dividing an encoding unit of an image along a direction which crosses a line, and a piece of trajectory information representing a displacement of the boundary associated with progress of the line and outputting the image, the method comprising:
separating the encoded data into the boundary headers and the pieces of trajectory information;
deciding, in accordance with the number of boundaries, whether to store all the boundary headers in a holding unit all at once; and decoding, for each line, the line based on the boundary header held by the holding unit.

19. A non-transitory computer-readable storage medium storing a computer program for causing a computer to execute a decoding method of decoding encoded data including a boundary header used to identify a boundary that partitions each of a plurality of regions obtained by dividing an encoding unit of an image along a direction which crosses a line, and a piece of trajectory information representing a displacement of the boundary associated with progress of the line and outputting the image, the method comprising:

separating the encoded data into the boundary headers and the pieces of trajectory information;

deciding, in accordance with the number of boundaries, whether to store all the boundary headers in a holding unit all at once; and decoding, for each line, the line based on the boundary header held by the holding unit.

20. A method of generating encoded data including a boundary header used to identify a boundary that partitions each of a plurality of regions obtained by dividing an encoding unit of an image along a direction which crosses a line, and a piece of trajectory information representing a displacement of the boundary associated with progress of the line, the method comprising:

if the number of boundaries is larger than a predetermined number, generating a first bit string representing the predetermined number of boundary headers;

arranging a second bit string representing the trajectory information corresponding to a first line next to the first bit string; and arranging at least one bit string representing the remaining boundary headers next to the second bit string.

21. The method according to claim 20, wherein the arranging the at least one bit string next to the second bit string includes, if the number of boundaries that end in a certain line is smaller than the number of boundary headers that are not yet arranged, selecting the boundary headers as many as the number of boundaries that end in the line from the boundary headers that are not yet arranged and arranging the boundary headers next to the trajectory information corresponding to the line, and if the number of boundaries that end in the line is not less than the number of boundary headers that are not yet arranged, arranging all the boundary headers that are not yet arranged, next to the trajectory information corresponding to the line.

* * * * *